(12) United States Patent
Arbabian et al.

(10) Patent No.: US 11,269,054 B2
(45) Date of Patent: Mar. 8, 2022

(54) PARTIALLY COORDINATED RADAR SYSTEM

(71) Applicant: Plato Systems, Inc., San Mateo, CA (US)

(72) Inventors: Mohammad Amin Arbabian, San Francisco, CA (US); Babak Mamandipoor, Burlingame, CA (US)

(73) Assignee: Plato Systems, Inc., San Carlos, CA (US)

(*) Notice: Subject to any disclaimer, the term of this patent is extended or adjusted under 35 U.S.C. 154(b) by 202 days.

(21) Appl. No.: 16/438,442

(22) Filed: Jun. 11, 2019

(65) Prior Publication Data

US 2020/0003867 A1 Jan. 2, 2020

Related U.S. Application Data

(60) Provisional application No. 62/763,360, filed on Jun. 11, 2018.

(51) Int. Cl.
*G01S 7/40* (2006.01)
*G01S 13/42* (2006.01)

(52) U.S. Cl.
CPC .......... *G01S 7/4008* (2013.01); *G01S 7/4021* (2013.01); *G01S 13/42* (2013.01)

(58) Field of Classification Search
CPC ........ G01S 13/003; G01S 13/42; G01S 13/86; G01S 13/878; G01S 2013/468; G01S 7/003; G01S 7/4008; G01S 7/4021
See application file for complete search history.

(56) References Cited

U.S. PATENT DOCUMENTS

| 5,410,314 | A | 4/1995 | Frush et al. |
| 2006/0202885 | A1 | 9/2006 | Chen |
| 2014/0126612 | A1* | 5/2014 | Tresidder ............ G06F 13/4273 375/145 |
| 2018/0024233 | A1* | 1/2018 | Searcy ................... G01S 7/032 342/125 |

(Continued)

FOREIGN PATENT DOCUMENTS

WO    WO-2019241309 A1   12/2019

OTHER PUBLICATIONS

"International Application Serial No. PCT/US2019/036637, International Search Report dated Oct. 10, 2019", 4 pgs.

(Continued)

*Primary Examiner* — Timothy X Pham
(74) *Attorney, Agent, or Firm* — Schwegman Lundberg & Woessner, P.A.

(57) ABSTRACT

A partially coordinated radar system is provided comprising: a radar transmitter; a radar receiver; processing circuitry; a first spatial information indicator; a side channel communication system to send radar waveform configuration information from the transmitter to the receiver; processing circuitry to use the waveform information to configure the radar receiver to receive the waveform signal; determine radar-based spatial information based upon the radar waveform signal; determine a mismatch of clocks or local oscillators of transmitter and receiver; and generating a compensation signal indicating correction information to compensate for the determined at least one mismatch.

24 Claims, 11 Drawing Sheets

(56) References Cited

U.S. PATENT DOCUMENTS

2018/0088221 A1* 3/2018 Yomo .................. G01S 13/003
2018/0149741 A1* 5/2018 Janssen ................. G01S 7/292
2018/0316482 A1* 11/2018 Gudovskiy ............. H04L 7/005

OTHER PUBLICATIONS

"International Application Serial No. PCT/US2019/036637, Written Opinion dated Oct. 10, 2019", 8 pgs.

* cited by examiner

PARTIALLY COORDINATED RADAR SYSTEM

CROSS-REFERENCE TO RELATED APPLICATION

This patent application claims the benefit of U.S. Provisional Patent Application No. 62/763,360, filed Jun. 11, 2018, entitled "Partially Coordinated Radar System", which is incorporated by reference herein in its entirety.

BACKGROUND

Radar systems generally require timing synchronization of transmitter and receiver to accurately determine spatial information for a target in a field of view of the radar receiver. However, synchronizing timing of a transmitter and a receiver that are capable of motion relative to one another is challenging.

BRIEF DESCRIPTION OF DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals and/or letters in the various examples. This repetition is for simplicity and clarity and does not in itself dictate a relationship between the various embodiments and/or configurations discussed.

DETAILED DESCRIPTION

Figure 1:
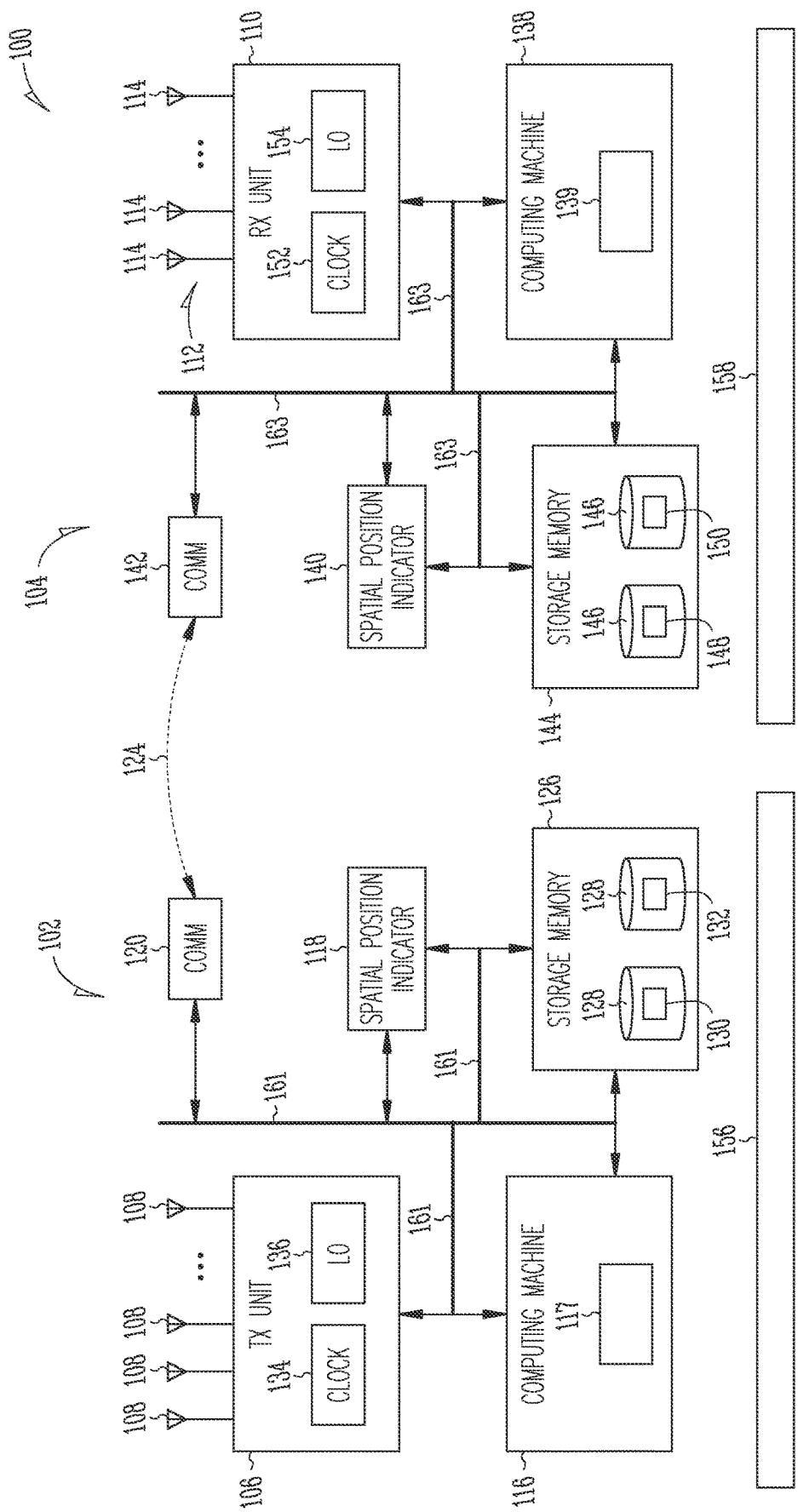
FIG. 1 is an illustrative block diagram of an example partially coordinated radar system.

FIG. 1 is an illustrative block diagram of an example partially coordinated radar system 100. The partially coordinated radar system 100 includes a radar transmitter subsystem 102 and a radar receiver subsystem 104. The radar transmitter sub-system 102 includes a radar transmitter unit ('Tx unit') 106 that includes at least one antenna 108. The radar receiver subsystem 104 includes a radar receiver unit ('Rx unit') 110 that includes a receiver antenna array 112 that includes multiple antennas 114. The Tx unit 106 is not synchronized in timing or frequency with the Rx unit 110. The partially coordinated radar system 100 determines timing clock mismatch frequency mismatch, and phase mismatch based upon a combination of spatial information at least one of the Rx unit and the Tx unit together with and radar-based spatial information. The system 100 compensates at the Rx unit 110 for such mismatch so that the Tx unit 106 and Rx unit 110 can interoperate as components of a synchronized bistatic radar system.

The example radar transmitter subsystem 102 includes the Tx unit 106 that is co-located with a first computing machine 116 that includes a first processor device 117, a first spatial position indicator unit 118 to provide first spatial information indicative of a spatial disposition of the Tx unit 106, a first communication device 120 to communicate information over a side channel 124, and at least one first storage device 126 that includes non-transitory media 128 to store information including program instructions 130 and data 132. The Tx unit 106 includes a first local timing clock 134 and a first local oscillator (LO) 136. A first communication bus system 161 provides communication among components of the radar transmitter subsystem 102.

The example radar receiver subsystem 104 includes the Rx unit 110 that is co-located with a second computing machine 138 that includes a second processor device 139, a second spatial position indicator unit 140 to provide second spatial information indicative of a spatial disposition of the Rx unit 110, a second communication device 142 to communicate information over the side channel 124, and at least one second storage device 144 that includes non-transitory media 146 to store information including program instructions 148 and data 150. The Rx unit 110 includes a second local timing clock 152 and a second LO 154. A second communication bus system 163 provides communication among components of the radar receiver subsystem 104.

Figure 2:
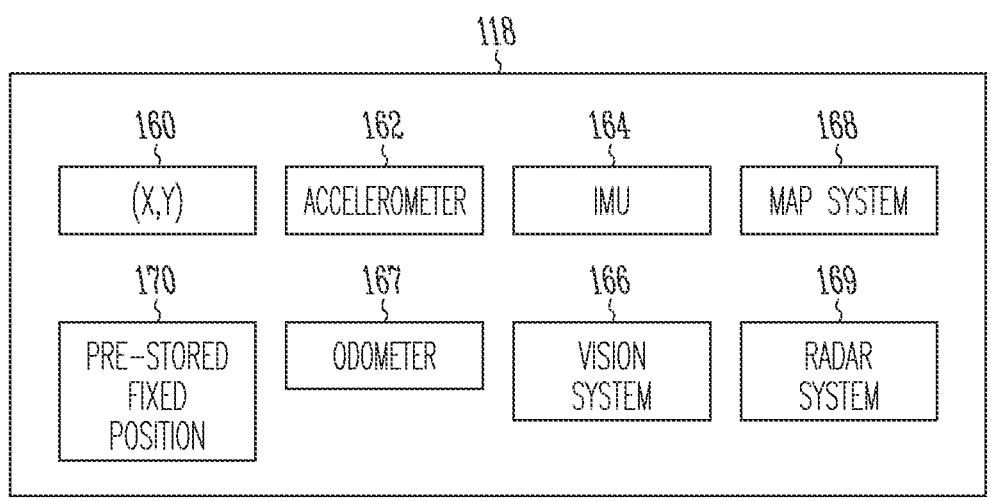
FIG. 2 is an illustrative block diagram showing certain details of an example implementation of the first spatial position indicator unit of FIG. 1.

FIG. 2 is an illustrative block diagram showing certain details of an example first spatial position indicator unit 118 of FIG. 1. The example first nt spatial position indicator unit 118 includes multiple different types of spatial position indicators 160-171 that determine spatial position without using radar. One or more of the different types of spatial position indicators is used at any given time to make a determination of spatial disposition of the Tx unit 106. A global position indicator 160, such as a GPS or GLASS receiver, indicates physical location of the Tx unit 106 such as latitude and longitude coordinates. An accelerometer 162 measures acceleration motion of the Tx unit 106. An inertial measurement unit (MU) 164 measures inertial changes of the Tx unit 106. A vision system 166 provides information about locations of objects within a vision system scene that can serve as reference locations for use to infer a location of the Tx unit or the Rx unit. A radar system 169 provides information about locations of objects within a field of view of the system scene that can serve as reference locations for use to infer a location of the Tx unit or the Rx unit (or one or more of the reflectors in the scene). An example radar transmitter subsystem 102 can include a Tx/Rx pair (not shown) that share a common clock and LO, and therefore, are synchronized. The radar receiver subsystem also may include a Tx/Rx pair (not shown) that share a common clock and LO and therefore are synchronized. Such Tx/Rx pairs can detect objects within their respective radar fields of view, and therefore, can act as spatial position indicators. However, the Tx/Rx pairs on the transmitter and receiver subsystems 102, 104 are not coordinated with each other. A map system 168 can provide a customized map information that can serve as a reference to determine a spatial location information based upon nearby geographic landmarks (e.g., structures such as buildings), previously captured vision system images, previously captured radar images, or point clouds, for example. An odometer 167 measures a path. In a motor vehicle platform, for example, an odometer ordinarily measures a path based upon wheel turns. In an aerial drone platform, for example, an odometer often measures a path based upon a vision system, for example. An example pre-stored fixed position information 170 can be stored at the storage memory 126, for example, if the Tx unit 106 can be used to provide location information for a fixed location. Alternative example implementations of the spatial position indicator unit 118 include less than all of the different example spatial position indicators 160-170 or can include other spatial position indicators (not shown). An example second spatial position indicator unit 140 that is similarly configured with a collection containing one or more different types of spatial position indicators will be understood from the explanation of FIG. 2.

The first and second communication devices can include wireless, wireline, optical communication devices, or Internet-connected communication devices including cloud-connected communication devices. The first and second communication devices 120, 142 are configured to communicate over a side channel 124 that is supports communication of radar waveforms between the TX unit and the Rx unit 110. For example, the side channel includes a set of frequencies that 124 provides a reliable medium to communicate radar waveform parameters and spatial information from the radar transmitter subsystem 102 to the radar receiver subsystem 104.

The radar transmitter subsystem 102 is attached to a first platform 156. The radar receiver subsystem 104 is attached to a second platform 158. The first and second platforms 156, 158 are capable of motion relative to one another. Both the first and second platforms 156, 158 may be capable of motion and may include a motor vehicle, an aerial drone, a boat, or a motor cycle, for example. Alternatively, one of the two platforms 156, 158 may be capable of motion while the other has a fixed position and may include a fixed structure such as a building, for example. The capability of the first and second platforms to move relative to one another complicates the challenge of compensating for the absence of synchronization between the Tx unit 106 and the Rx unit 110.

In operation, the Tx unit 106 transmits radar waveform signals, which may be reflected by objects (not shown) within a field of view of the Rx unit 110, which receives the radar waveform signals and converts them from analog to digital form for processing to infer scene information, such as location, angle and relative speed of objects in a field of view of the RX unit 110. The first computing machine 116 provides control signals to control operation of the first local timing clock 134 and the first LO 136 to generate the radar waveform signals. The second computing machine 138 provides control signals to control operation of the second local timing clock 152 and the second LO 154 to receive the transmitted radar waveform signals. The local timing clocks 134, 152 provide a stable and accurate low frequency reference clock signals. Example local timing clocks includes a crystal oscillator, which exhibits low phase noise.

Prior to transmission of a radar waveform by the Tx unit 106, the first computing machine 116 causes the first communication device 120 to communicate waveform configuration information over the side channel 124 to the second communication device 142 for use by the second computing machine 138 to control the second clock 152 and second LO 154 of the Rx unit 110 in receiving the radar waveform signal. The waveform configuration information includes information to inform the second computing machine 138 how to interpret a waveform signal received from the transmit unit 106. For a chirp waveform, for example, waveform configuration information typically includes start frequency, slope, pulse repetition rate and duration. For an OFDM waveform, for example, waveform configuration information typically includes bandwidth starting and ending frequencies, bandwidths for each subchannel, symbol duration and repetition frequency. For a phase modulated waveform, for example, waveform configuration information typically includes a sinusoid frequency and a change frequency code pattern. For a simple sinusoid waveform, the waveform configuration information typically includes a sinusoid frequency.

The first communication device 120 communicates the first spatial position information to the second communication device 142. To compensate for absence of synchronization of the Tx unit 106 and the Rx unit 110, the second computing machine is configured using computer program instructions 148 stored in the second storage device 144, to generate radar-based spatial information indicative of a spatial disposition of the Tx unit 106 and to use the first and second spatial information and the radar-based spatial information to determine a mismatch between at least one of timing of the first and second local timing clocks 134, 152 and a mismatch of frequency and/or phase of the first and second LOs 136, 154. The second computing machine 138 is further configured using computer program instructions 148 stored in the second storage device 144, to generate a compensation signal indicating correction information for a determined mismatch.

Figure 3:
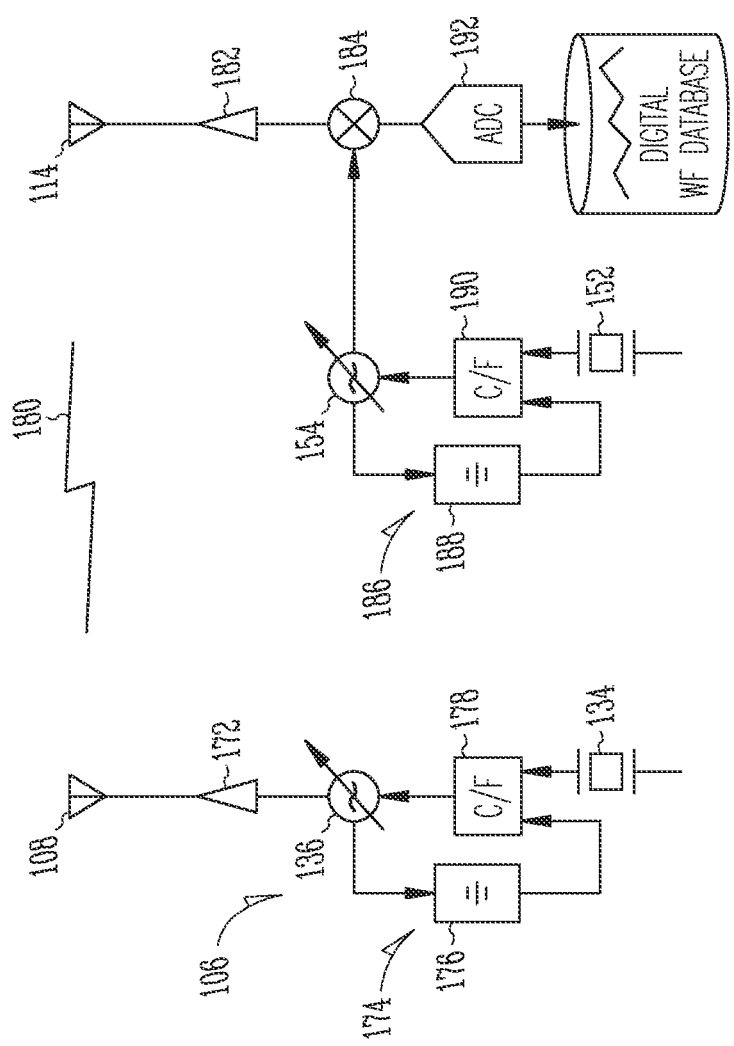
FIG. 3 is illustrative schematic diagram representing certain details of the Tx unit and the Rx unit of FIG. 1.

FIG. 3 is illustrative schematic diagram representing certain details of the Tx unit 106 and the Rx unit 110 of FIG. 1. The Tx unit 106 includes the first local timing clock 134, a first local oscillator 136, a power amplifier 172, and the transmitter antenna 108. The first local timing clock 134 and the first local oscillator 136 are operably coupled in a first phase lock loop (PLL) circuit 174 that includes an divider circuit block 176 operably coupled between the first local timing clock 134 and the first local oscillator 136 and a phase comparator and loop filter circuit block 178 operably coupled in a feedback path between the first local oscillator 136 and the divider circuit block 176. The first local timing clock 134 provides a first timing clock signal. The first local oscillator 136 produces a first local oscillator signal at a selectable radio frequency (RF) controlled using the PLL 174 based upon the first timing clock signal. The first local oscillator frequency typically is controlled to produce a complex radar waveform signal such as, a chirp waveform signal, for example. The power amplifier 172 is operably coupled to amplify the first LO signal and to provide the amplified radar waveform signal to the transmitter antenna 114, which transmits a radar waveform signal 180 for reception by the Rx unit 110.

The Rx unit 110 includes the second local timing clock 152, the second local oscillator 154, a low noise amplifier 182, a mixer circuit 184, an analog to digital converter (ADC) circuit and a receiver antenna array. The second local timing clock 152 and the second local oscillator 154 are operably coupled in a second phase lock loop (PLL) circuit 186 that includes an divider circuit block 188 operably coupled between the second local timing clock 152 and the second local oscillator 154 and an phase comparator and loop filter circuit block 190 operably coupled in a feedback path between the second local oscillator 154 and the divider block 188. The second local timing clock 152 provides a second timing clock signal. The second local oscillator 154 produces a second local oscillator signal at a selectable second radio frequency (RF) controlled using the second PLL 186 based upon the second timing clock frequency signal. The second LO frequency typically is controlled to match the complex radar waveform signal produced by the first LO 136. The receiver antenna 114 receives the transmitted radar waveform signal 180. The low noise amplifier 182 is operably coupled to amplify the received radar waveform signal 180. The mixer 184 receives the second LO signal and the amplified received transmitted waveform and provides the mixed signal to analog to digital converter ADC circuitry 192 for storage at the second storage memory 144 as digital waveform data 194.

The Tx unit 106 and the Rx unit 110 are only partially coordinated in that Tx unit transmits to Rx unit a known radar waveform but timing of the first timing clock 134 at Tx unit is not synchronized with timing of the second timing clock 152 at Rx unit 110 and the phase and frequency of the first LO 136 at Tx unit is not synchronized with the phase and frequency of the second LO 154 at Rx. More particularly, for example, the first timing clock 134 and first LO 136 of an example Tx unit 106 can be controlled to transmit a certain radar waveform, such as a certain sequence of chirp signals for example, and the second timing clock 152 and second LO 154 of an example Rx unit 110 can be controlled to receive the certain radar waveform. Moreover, for example, the first timing clock 134 of the Tx unit 106 and the second timing clock 152 of the Rx can be controlled to operate at matching frequencies, but the first and second timing clocks are not synchronized with one another, and therefore, a timing mismatch can occur between them. Additionally, for example, the first LO 136 of the Tx unit 106 and the second LO 154 of the Rx unit 110 can be controlled to operate at matching frequencies, but the first and second LOs are not synchronized with one another, and therefore, phase and frequency mismatches can occur between a first LO signal produced by the first LO 136 and a second LO signal produced by the second LO.

Figure 4:
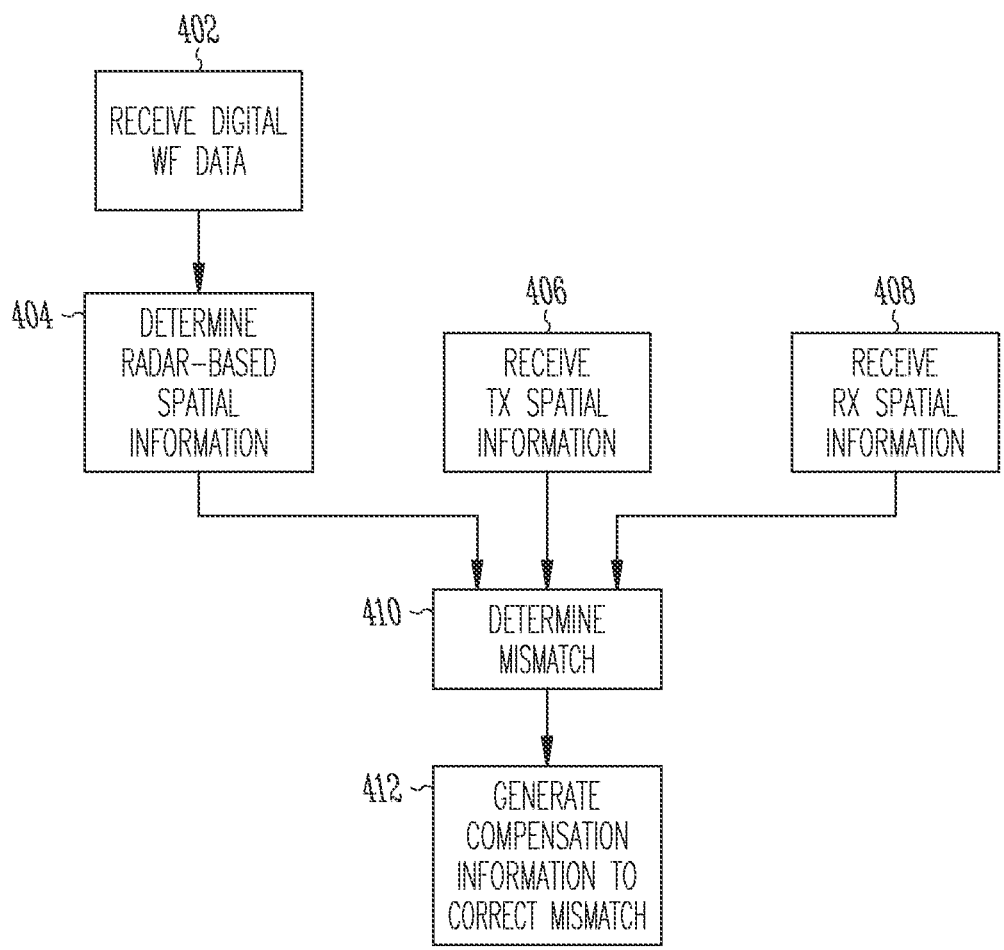
FIG. 4 is an illustrative flow diagram representing an example coordination process to compensate for synchronization mismatch between the Tx unit and the Rx unit.

FIG. 4 is an illustrative flow diagram representing an example coordination process 400 to compensate for synchronization mismatch between the Tx unit 106 and the Rx unit 110. The second computing machine 138 is configured according program instructions 148 to implement the example coordination process 400. At block 402, stored digital radar waveform data 194 is received as explained above with reference to FIG. 3. At block 404, radar-based spatial information indicative of a spatial disposition of the Tx unit is determined based upon the received radar waveform. At block 406, first spatial information indicative of spatial disposition of the Tx unit 106 is received. At block 408, second spatial information indicative of spatial disposition of the Tx unit 106 is received. At block 410, a synchronization mismatch is determined based at least in part upon the radar-based spatial information, the first spatial information and the second spatial information. At block 412, a compensation control signal is generated indicating correction information to compensate for the mismatch. The coordination process 400 continues throughout interoperation of the Tx unit 106 and the Rx unit 110.

An example partially coordinated radar system performs compensation in response to correction signal information by adjusting at least one of timing of the second clock timing signal, frequency of the second LO signal, and phase of the second LO signal. More specifically, to correct a timing mismatch, for example, the timing of the received waveform shift is shifted in time. To correct a frequency mismatch, for example, the received waveform is multiplied by a sinusoidal signal of the mismatch frequency and result is passed through a low-pass filter. To correct for a phase mismatch, for example, a phase shift is applied to the received waveform. An example approach to approach to compensating for mismatch is to adjust at least one of saved digital waveform data indicative of at least one of timing of the second clock timing signal, frequency of the second LO signal, and phase of the second LO signal.

After correction for mismatched in clock/LO and/or phase, the Tx/Rx pair can operate in a bi-static mode. Meaning to say work as if they are "virtually" synchronized. Thus, if the Tx transmits a signal that hits a target/reflector in the scene and then is received by Rx, accurate spatial information can be estimated for the target (e.g., range, angle, velocity/Doppler shift, etc) based upon the received waveform. However, the compensation process continues to operate since mismatch can arise again due to frequency drift of the second clock/LO, for example. Thus, even while the Tx/Rx pair operate in bistatic mode, the compensation process continues to run in the background to update compensation as necessary, due to changes in mismatch due to clock/LO drift, for example.

Example 1

Figure 5:
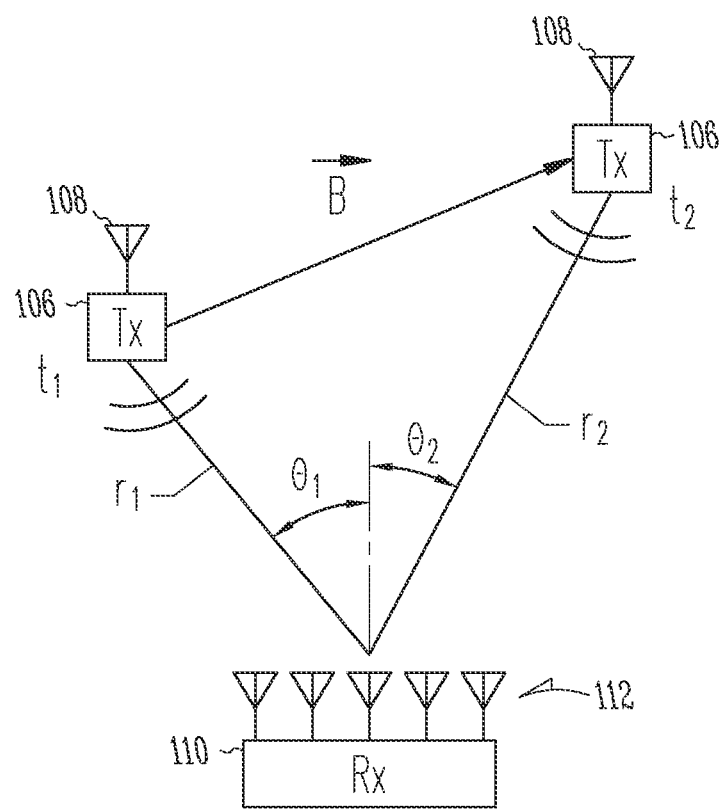
FIG. 5 is an illustrative block diagram representing a first example arrangement in which the Tx unit and Rx unit of FIG. 1 move relative to one another during transmission of a radar waveform from the Tx unit to the Rx unit.

FIG. 5 is an illustrative block diagram representing a first example arrangement of the Tx unit 106 and the Rx unit 110 of FIG. 1 in which they move relative to one another during transmission of a radar waveform from the Tx unit 106 to the Rx unit 110. To simplify FIG. 5, components of the partially coordinated radar system 100 other than the Tx unit 106 and the Rx unit 110 are not shown. Tx and Rx units are only partially coordinated in that the Tx unit transmits to the Rx unit a known radar waveform, but the Tx unit 106 and the Rx 110 unit have respective first and second timing clocks 134, 152 and respective first and second LOs 136, 154 that are separate, and therefore, not synchronized. Such partial coordination results in challenges estimating distance between the Tx unit 106 and the Rx unit 110. For example, assume that the Tx unit 106 transmits a narrow timing pulse. Due to the absence of synchronization of the first and second timing clocks 134, 152, the Rx unit 110 does not know the time at which the Tx unit 106 transmitted the pulse, and therefore, the Rx unit 110 cannot use the time required for the pulse to travel from the transmitter unit 106 to the receiver unit 110 as a basis to accurately determine the distance between the Tx and Rx units.

In the first example, timing synchronization between the Tx unit 106 and the Rx unit 110 is achieved using radar-based spatial information determined at the Rx unit 110, first spatial information provided by the first spatial position indicator unit 118, and second spatial information provided by the second spatial position indicator unit 140. The first spatial information is communicated by the first communication device 120 to the second communication device 142. In the first example, it is assumed that Tx is in motion and Rx is stationary.

The first spatial position indicator unit 118 provides an indication of the spatial position of the Tx unit 106. An example first spatial position indicator unit 118 is configured to act as a spatial sensor that senses motion of the Tx unit 106 and produces corresponding first spatial information indicative of the spatial disposition of the Tx unit 106. More particularly, an example first spatial position indicator unit 118 includes a global position indicator 160, an accelerometer 162, and an IMU 164 that cooperate to act as a spatial sensor that senses a spatial motion pattern of the Tx unit 106 that is indicative of the spatial disposition of the Tx unit 106. For simplicity, the spatial motion pattern is assumed to be linear motion along vector $\vec{B}$.

The second spatial position indicator unit 140 provides an indication of the spatial position of the Rx unit 110. An example second spatial position indicator unit 140 is configured to act as a spatial sensor that senses position of the Rx unit 110 and produces corresponding second spatial information indicative of the spatial disposition of the Rx unit 110. More particularly, an example second spatial position indicator unit 140 includes a global position indicator 160 that acts as a spatial sensor and provides second spatial information that indicates a spatial location of the Rx unit 110.

The Tx unit 106 transmits a radar waveform to the Rx unit 106. For simplicity, it is assumed that the Tx unit transmits the radar waveform along a line-of-site, that is, without reflection, to the Rx unit. However, it will be appreciated that transmission of a radar waveform on a direct line of sight between the Tx unit 106 and the Rx unit 110 is not required to determine radar-based spatial information. The radar waveform includes a first radar pulse at time $t_1$ and includes a second radar pulse at time $t_2$.

The second computing machine 138 is configured to produce first radar-based spatial information indicative of angles at arrival $\theta_1$ and $\theta_2$, of the radar waveform at times $t_1$ and $t_2$, respectively. Antennas of the Rx antenna array 112 are angled to capture the wavefront of the radar waveform at $t_1$ as it moves across the antenna array 112 and again at $t_2$ as it moves across the antenna array 112. The second processor 139 processes the captured waveform information to produce the first radar-based spatial information indicative of angle at arrival $\theta_1$ at $t_1$ and angle at arrival $\theta_2$ at $t_2$. It is noted that the absence of timing synchronization between Tx and Rx has no impact on measurement of angle at arrival, and therefore, persons of ordinary skill in the art will understand how to process the received waveform to determine angle at arrival despite the Tx unit and the Rx unit being unsynchronized.

The second computing machine 138 is configured to produce second radar-based spatial information indicative of an estimated distances $R_1$ and $R_2$ between the Tx unit 106 and the Rx unit 108, at $t_1$ and at $t_2$, respectively. The actual distances are $r_1$ at $t_1$ and $r_2$ at $t_2$. A pulse transmitted by the Tx unit at $t_1$ will arrive at the Rx unit at time $t_1+(r_1/c)$, and a pulse transmitted by the Tx unit at $t_2$, will arrive at the Rx unit at time $t_2+(r_2/c)$. The Rx antenna array captures the first timing pulse as $t_1$ and captures the second timing pulse at $t_2$.

The second processor 139 processes the captured first pulse and the captured second puke to produce estimated distances is $R_1$ and $R_2$.

Because the Tx unit and the Rx unit are not synchronized, the measured distances R1 and $R_2$ are estimates. Techniques can be used to improve the accuracy of these estimates of distances $R_1$ and $R_2$ between the Tx unit and the Rx unit. For example, a pilot signal can be used to indicate time of initiation of a radar waveform transmission. Alternatively, for example, the radar waveform can include a series of pulses with a known time separation between them.

It is noted that if the respective timing clocks 134, 152 at the Tx unit 106 and the Rx unit 110 were synchronized apriori, then a time at arrival of a pulse transmitted by the Tx and received at the Rx unit could have been used to estimate the actual ranges $r_1$ and $r_2$ without need for angle at arrival information and side information. In the first example, however, the respective clocks 134, 152 are not synchronized, and therefore, there exists an unknown timing pulse bias (that leads to a range (distance) bias denoted herein by "b"), in each of the distance estimates, $R_1$ and $R_2$.

The partially coordinated distance estimates at the Rx unit 110 are represented as:

$$\begin{cases} R_1 = r_1 + b & \text{for pulse transmitted at } t_1 \\ R_2 = r_2 + b & \text{for pulse transmitted at } t_2 \end{cases}$$

An estimated difference in actual distance between the Tx unit and the Rx unit at $t_1$ and $t_2$ is represented as, $$r_1 - r_2 = R_1 - R_2 = \Delta r$$

An example second processor 139 is configured to determine estimates of actual ranges $r_1$ and $r_2$ based upon the radar-based information, $\theta_1$, $\theta_2$, and the radar-based information, $\Delta r$, the first spatial information, vector $\vec{B}$, indicative of a spatial disposition of the Tx unit 106, and the second spatial information indicative of a spatial disposition of the Rx unit 110. The example second processor 139 is configured to use triangulation to determine the actual ranges $r_1$ and $r_2$. The second processor 139 is configured to determine a value for the range bias "b", since $b = R_1 - r_1$, for example.

The example second processor 139 is configured to determine timing mismatch between the first and second timing clocks 134, 152 since the range bias "b" is known, and since it is known that a pulse transmitted by the Tx unit at $t_1$ will actually arrive at the Rx unit at time $t_1+(r_1/c)$, and a pulse transmitted by the Tx unit at $t_2$, will actually arrive at the Rx unit at time $t_2+(r_2/c)$.

The second processor 139 generates a compensation signal indicating correction information to compensate for the determined timing clock mismatch. An example second processor 139 is configured using program instructions 158 to send a control signal to time shift the second clock 134 by an amount to compensate for the timing clock mismatch. An alternate example processor 139 is configured using alternate example program instructions 158 to adjust a saved digital representation of a radar waveform to produce an adjusted saved digital data that would have resulted if the second clock 139 had been time shifted at the time of arrival of the radar waveform.

Example 2

Figure 6:
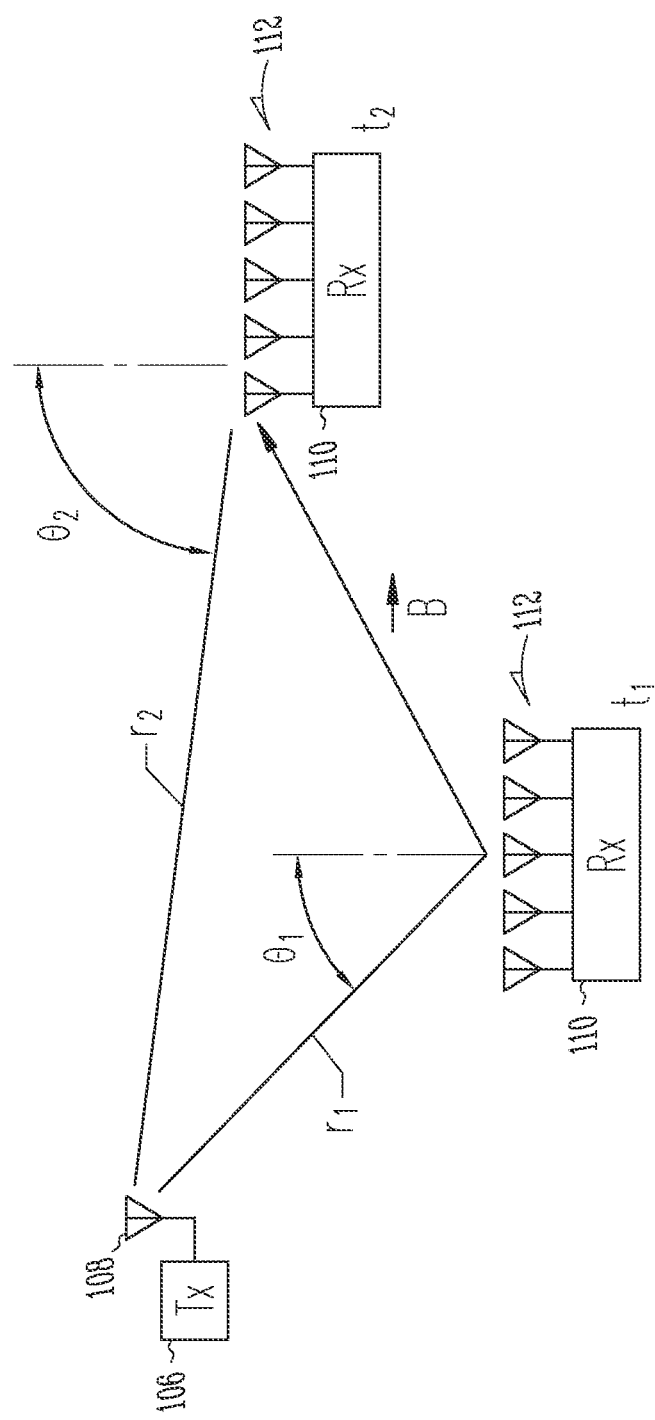
FIG. 6 is an illustrative block diagram representing a second example arrangement in which the Tx unit and Rx unit of FIG. 1 move relative to one another during transmission of a radar waveform from the Tx unit to the Rx unit.

FIG. 6 is an illustrative block diagram representing a second example arrangement of the Tx unit 106 and the Rx 110 in which they move relative to one another during transmission of a radar waveform from the Tx unit to the Rx unit 110. Tx and Rx are only partially coordinated, which results in challenges in estimating distance between the Tx and the Rx, as explained above. In the second example, timing synchronization between the Tx unit 106 and the Rx unit 110 is achieved using radar measurements at the Rx unit, first spatial information ('side information') indicative of the spatial disposition of the Tx unit, and second spatial information indicative of the spatial disposition of the Rx unit. The first spatial information is communicated from the first communication device 120 co-located with the Tx unit 106 to the second communication device co-located with the Rx unit 110. In the first example, it is assumed that the Tx unit 106 is stationary, and the Rx unit 110 is in motion.

The first spatial position indicator unit 118 provides an indication of the spatial position of the stationary Tx unit 106. An example first spatial position indicator unit 118 is configured to act as a spatial sensor that senses position of the Tx unit 106 and produces corresponding first spatial information indicative of the spatial disposition of the Tx unit 106. More particularly, an example first spatial position indicator unit 118 includes a global position indicator 160 that acts as a spatial sensor and provides first spatial information that indicates a spatial location of the Tx unit 106.

The second spatial position indicator unit 140 provides an indication of the spatial position of the Rx unit 110. An example second spatial position indicator unit 140 is configured to act as a spatial sensor that senses motion of the Rx unit 110 and produces corresponding second spatial information indicative of the spatial disposition of the Rx unit 110. More particularly, an example second spatial position indicator unit 140 includes a global position indicator 160 and an odometer 167 that cooperate to act as a spatial sensor that senses a spatial motion pattern of the Rx unit 110 that is indicative of the spatial disposition of the Rx unit 110. For simplicity, the spatial motion pattern is assumed to be linear motion at constant velocity along vector $\vec{B}$.

The Tx unit 106 transmits a radar waveform to the Rx unit 110. For simplicity, it is assumed that the Tx unit 106 transmits the radar waveform along a line-of-site to the Rx unit, although it will be appreciated that transmission of the radar waveform on a line of sight between the Tx unit 106 and the Rx unit 110 is not required to determine radar-based spatial information. The radar waveform includes a first radar pulse at time $t_1$ and includes a second radar pulse at time $t_2$.

The second computing machine 138 is configured to produce first radar-based spatial information indicative of angles at arrival $\theta_1$ and $\theta_2$, of the radar waveform at times $t_1$ and $t_2$, respectively. The Rx antenna array 112 captures the wavefront of the radar waveform at $t_1$ as it moves across the antenna array and again at $t_2$ as it moves across the antenna array 112. The second processor 139 processes the captured waveform information to produce the first radar-based spatial information indicative of angle at arrival $\theta_1$ at $t_1$ and angle at arrival $\theta_2$ at $t_2$. As explained above, the absence of timing synchronization between the Tx unit and the Rx unit has no impact on measurement of angle at arrival, and therefore, persons of ordinary skill in the art will understand how to process the received waveform to determine angle at arrival despite the Tx unit and the Rx unit being partially coordinated.

The second computing machine 138 is configured to produce second radar-based spatial information indicative of estimated distances $R_1$ and $R_2$ between the Tx unit and the Rx unit, at $t_1$ and at $t_2$, respectively. The actual distances are $r_1$ at $t_1$ and $r_2$ at $t_2$. A pulse transmitted by the Tx unit at $t_1$ will arrive at the Rx unit at time $t_1+(r_1/c)$, and a pulse transmitted by the Tx unit at $t_2$, will arrive at the Rx unit at time $t_2+(r_2/c)$. The Rx unit antenna array 112 captures the first timing pulse as $t_1$ and captures the second timing pulse at $t_2$. The second processor 139 processes the captured first pulse and the captured second pulse to produce the estimated distances is $R_1$ and $R_2$. As explained above, techniques can be used to improve the accuracy of these estimates of distances $R_1$ and $R_2$ between the Tx unit and the Rx unit.

Since the respective timing clocks 134, 152 are not synchronized, there exists an unknown timing pulse bias distance "b", explained above, in each of the partially coordinated distance estimates, $R_1$ and $R_2$.

The partially coordinated distance estimates at the Rx unit 110 are represented as:

$$\begin{cases} R_1 = r_1 + b & \text{for pulse transmitted at } t_1 \\ R_2 = r_2 + b & \text{for pulse transmitted at } t_2 \end{cases}$$

An estimated difference in actual distance between the Tx unit and the Rx unit at $t_1$ and $t_2$ is represented as, $$r_1 - r_2 = R_1 - R_2 = \Delta r$$

The example second processor 139 is configured to determine estimates of actual ranges $r_1$ and $r_2$ based upon the first radar-based information, $\theta 1$, $\theta 2$, and the second radar-based information, $\Delta r$, the first spatial information indicative of the spatial disposition of the Tx unit 106, and the second spatial information indicating the vector $\vec{B}$, which is indicative of the spatial disposition of the Rx unit 110. More specifically, the example second processor 139 is configured to use triangulation to estimate actual ranges $r_1$ and $r_2$. The example second processor 139 is configured to determine a value for the range bias "b", since $b=R_1-r_1$, for example. As explained above, the example second processor 139 is configured to determine a timing mismatch between the first and second timing clocks 134, 152. Moreover, as explained above, the example second processor 139 is configured to generate a compensation signal indicating correction information to compensate for the determined timing clock mismatch.

Example 3

Figure 7:
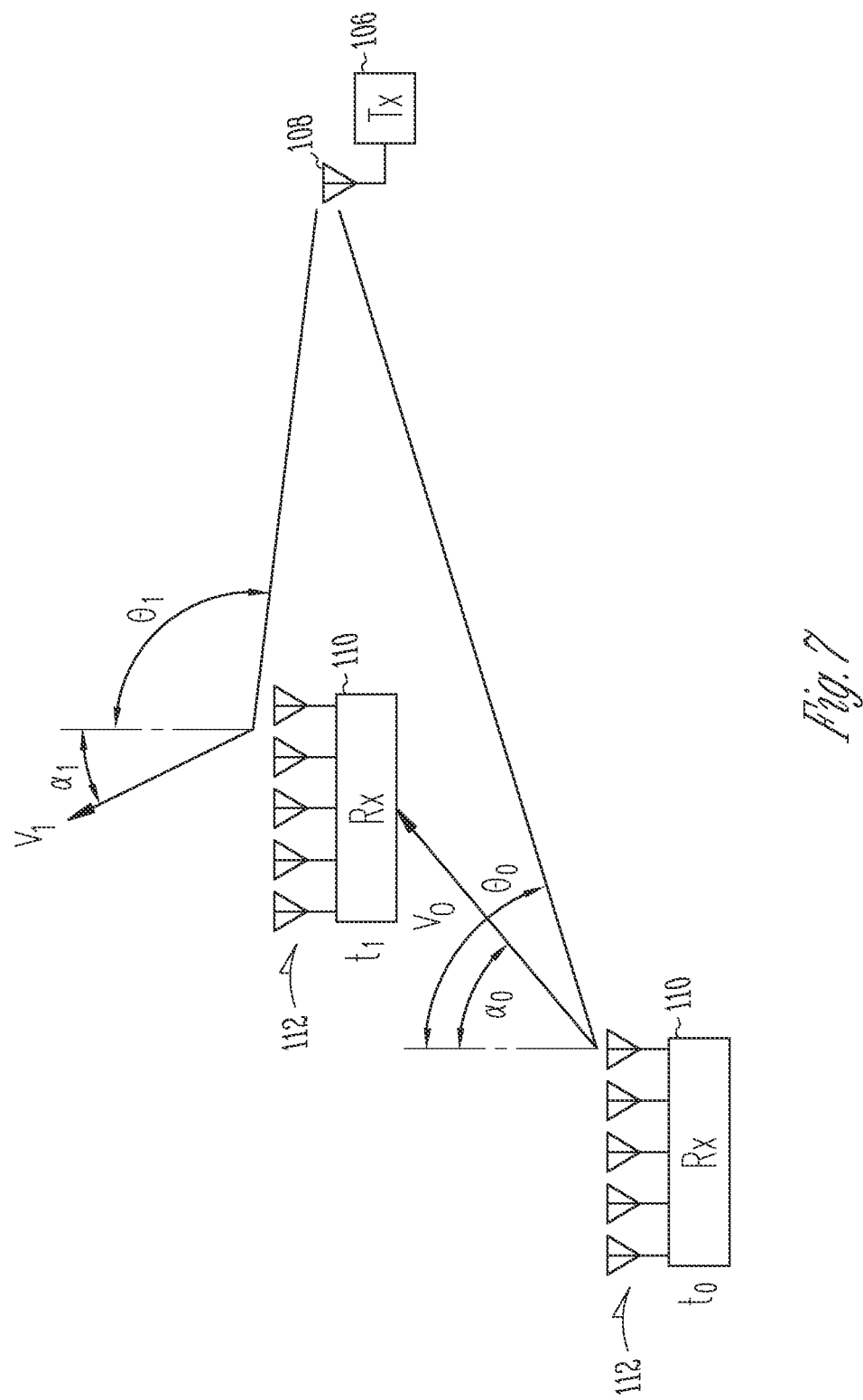
FIG. 7 is an illustrative block diagram representing a third example arrangement in which the Tx unit and the Rx unit move relative to one another during transmission of a radar waveform from the Tx unit to the Rx unit.

FIG. 7 is an illustrative block diagram representing a third example arrangement of a Tx unit 106 and an Rx unit 110 that move relative to one another during transmission of a radar waveform from the Tx unit to the Rx unit. An example pilot signal frequency is used to synchronize respective local oscillators 136, 154 of the Tx unit 106 and the Rx unit 110. The example pilot signal includes a sinusoidal signal having a frequency known to both the Tx unit and the Rx unit. The Tx unit 106 transmits the pilot signal as a radar waveform to the Rx unit 110. The example pilot signal also is used to gain an understanding of the relative motion of the Tx unit 106 and the Rx unit 110 so as to also synchronize their local oscillators.

In the third example arrangement, the Tx unit 106 transmits simple radar waveform that includes an example continuous-wave (single frequency tone) pilot signal, represented as, $$X_{tx}(t) = A \sin(2\pi f_c t + \varphi_1)$$

Where A is signal amplitude, $f_0$ is the Tx unit local oscillator frequency and $\varphi_1$ is a first angle.

The Rx unit 110 receives the pilot signal as, $$X_{rx}(t) = A' \sin(2\pi f_o(t-\Gamma+\varphi_1)$$

Where $$\Gamma = \frac{R}{C}$$

is the time needed for the pilot signal to propagate from the Tx unit to the Rx unit, and C is the speed at light and $\Gamma$.

The second LO 154 at the Rx unit 110 locally generates a corresponding continuous-wave signal for mixing with the pilot signal generated at the Tx unit 106. The example corresponding waveform includes a sinusoidal waveform at the Rx unit 110 that may exhibit a bias in frequency and phase compared to the sinusoidal pilot signal transmitted by the Tx unit 106 represented as, $$X_{loc}(t) = B \sin(2\pi f_1 t + \varphi_2)$$

Where B is signal amplitude, $f_1$ is the Rx unit local oscillator frequency and $\varphi_2$ is a second angle. It is noted that that slight mismatches between the local oscillator frequencies of the Tx unit and the Rx unit occur, since they are not synchronized, even though they nominally have identical frequencies. The example approach herein virtually synchronizes the Tx unit and Rx unit LO frequencies to correct for such possible mismatch.

With a relative velocity $V_{rel}$ between the Tx unit and the Rx unit, the time ($\Gamma$) required for the pilot signal to propagate from the Tx unit to the Rx unit, and the Doppler frequency, $F_D$ are represented as, $$\Gamma = \frac{R}{C} = \frac{2(R_o + V_{rel}t)}{C}$$

$$F_D(t_i) = 2\frac{V_{rel}(t_i)}{C} f_o$$

Where $R_0$ is the distance (range) between the Tx and Rx units at to.

Thus, $$X_{rx}(t) = A' \text{Sin}\left(2\pi f_o\left(t - \frac{(R_o + V_{rel}t)}{C}\right) + \varphi_3\right)$$

$$= A' \text{Sin}(2\pi(f_o + f_D)t + \varphi_3)$$

Where $\varphi 3$ is a third angle and $$F_D = -\frac{V}{C}$$

$f_o$ is the Doppler freq.

The Rx unit mixes the received signal $X_n(t)$ with the locally generated signal $X_{loc}$ and passes the resulting mixed signal through a highpass filter to produce a signal represented as, $$Y(t) = A'' \text{Sin}(2\pi(f_o + f_D)t + \varphi_3) \cdot \text{Sin}(2\pi f_1 t + \varphi_2)$$

$$\approx \frac{A''}{2} \text{Cos}(2\pi(f_o + f_D - f_1)t + \varphi_3 - \varphi_2)$$

$$= \frac{A''}{2} \text{Cos}(2\pi(\Delta f + f_D)t + \varphi_4)$$

Where $f_1$ is a local oscillator frequency at the Rx unit and $\Delta f = f_0 - f_1$, is the frequency difference between the frequencies of local oscillators at the Tx and Rx units.

The relative motion between Tx and Rx units is estimated by measuring the frequency at Y(t). The relative motion of the Tx and Rx units with can be determined based upon, $$F_D(t_i) = 2\frac{V_{rel}(t_i)}{C} f_o$$

The measured frequency at the Rx unit is represented as, $$F_{rxm}(t_i) = \Delta F + F_D(t_i)$$

Thus, in this third example, the partially coordinated radar system 100 determines a frequency mismatch, the $\Delta F$, between the first LO 136 at the Tx unit 106 and the second LO 154 at the Rx unit 110 based upon a value for the relative velocity between the Tx unit and the Rx unit, $V_{rel}(t)$. It is assumed in this third example that the Tx unit is stationary and that the Rx unit is in motion.

The first LO 136 in the Tx unit 106 acts as a first spatial indicator by generating the pilot signal that provides first spatial information indicative of a spatial disposition of the Tx unit 106. Upon mixing the pilot signal with the second LO frequency, the Rx unit determines radar-based spatial information in the form of Doppler values, $F_D(t_i)$, which is indicative relative spatial motion between the Tx unit and the Rx unit.

The second spatial position indicator unit 140 provides an indication of the spatial position of the Rx unit 110. An example second spatial position indicator unit 140 is configured to act as a spatial sensor that senses motion of the Rx unit 110 and produces corresponding second spatial information indicative of the spatial disposition of the Rx unit 110. More particularly, an example second spatial position indicator unit 140 includes a global position indicator 160 and an odometer 167 that cooperate to act as a spatial sensor that senses a spatial motion pattern of the Rx unit 110 that is indicative of the spatial disposition of the Rx unit 110. In this third example, the second spatial indicator unit 140 produces second spatial information indicating that at time=$t_0$, the Rx unit moves in a direction $\alpha_0$ with velocity $V_0$, and that at time=$t_1$, the Rx unit moves in a direction $\alpha_1$ with velocity $V_1$.

The Tx unit transmits a radar waveform. The Rx unit measures angles at arrival of the waveform at the two times, $\theta_0$ at $t_0$, and $\theta_1$ at $t_1$. The angles at arrival of the waveform at the two times, $\theta_0$ at $t_0$, and $\theta_1$ at $t_1$ represent radar-based spatial information.

In this third example, the example second processor 139 is configured to determine $\Delta F$ based upon $\alpha_0$, $V_0$, and $\theta_0$ at time to and based upon $\alpha_1$, and $\theta_1$ measured at time $t_1$.

More particularly, Measured frequency at the receiver:

$$f_{rxm} = f_0 - f_1 + \frac{V_{rel}}{c} f_0$$

The first processor 139 is configured to compute the relative velocity at times $t_0$ and $t_1$ as following:

$$\begin{cases} V_{rel}(t_0) = V_0 \cos(\theta_0 - \alpha_0) \\ V_{rel}(t_1) = V_1 \cos(\theta_1 - \alpha_1) \end{cases}$$

The first processor 139 is configured to solve for $f_0$ and $f_1$ from the following formulation indicating measured frequency at times $t_0$ and $t_1$:

$$\begin{cases} f_{rxm}(t_0) = f_0 - f_1 + \dfrac{V_{rel}(t_0)}{c} f_0 \\ f_{rxm}(t_1) = f_0 - f_1 + \dfrac{V_{rel}(t_1)}{c} f_0 \end{cases}$$

The first processor 139 is configured to use the determined ΔF as a basis to produce correction signals providing information for use to compensate for the difference in frequency of local oscillators at the Tx and Rx units.

An example second processor 139 is configured using program instructions 158 to send a control signal to adjust the frequency of the second LO 154 by an amount to compensate for the frequency mismatch. An alternate example processor 139 is configured using alternate example program instructions 158 to adjust a saved digital representation of a radar waveform to produce an adjusted saved digital data that would have resulted if the second LO 154 had its frequency adjusted to eliminate the frequency mismatch at the time of arrival of the radar waveform.

Example 4

Figure 8:
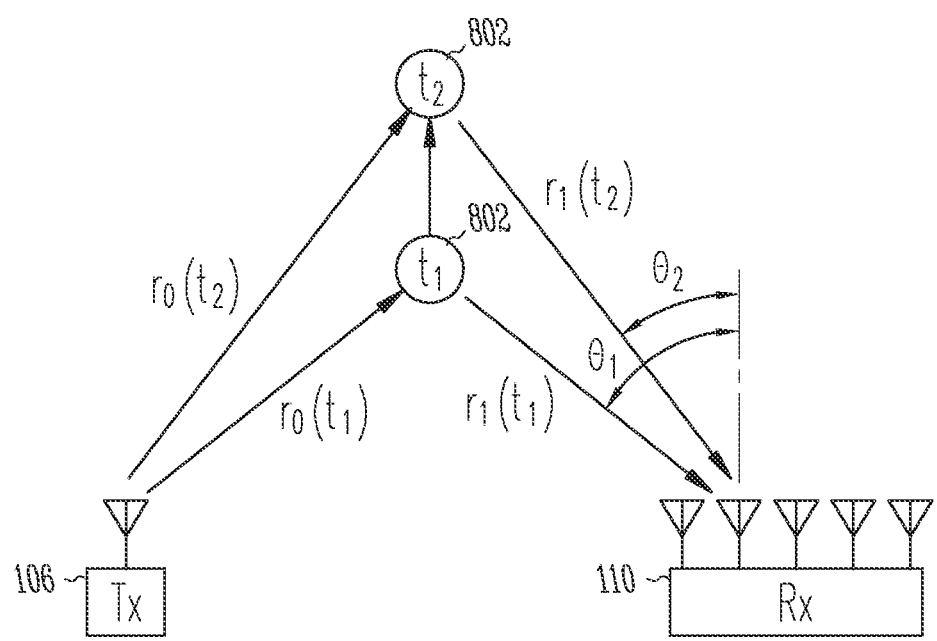
FIG. 8 is an illustrative block diagram representing a fourth example arrangement in which the Tx unit and the Rx unit are fixed in relation to one another and the Tx unit transmits a radar waveform that is received by the Rx unit after reflecting from a target object.

FIG. 8 is an illustrative block diagram representing a fourth example arrangement in which the Tx unit 106 and the Rx 110 are fixed in relation to one another and the Tx unit transmits a radar waveform that is received by the Rx unit after reflecting from a target object 802. In this fourth example, an inference as to whether the target object 802 is in motion is determined using radar measurements at the Rx unit 110 and first spatial information indicative of the spatial disposition of Tx unit 106 and second spatial information indicative of spatial disposition of the Rx unit 110.

The first spatial position indicator unit 118 provides first spatial information that indicates a spatial position of the Tx unit 106. The second spatial indicator 140 provides second spatial information that indicates a spatial position of the Rx unit 110. The first communication device 120 co-located with the Tx unit 106 communicates the first spatial information over the side channel 124 to the second communication device 142 co-located with the Rx unit 110.

The Tx unit transmits a radar waveform, which reflects from a reflecting object 802 to the Rx unit 110. It is noted that a path length travelled by the radar waveform between the Tx unit 106 and the Rx unit 110 is the sum of a distance $r_1$, traveled between the Tx unit and the object 801, and a distance $r_2$, traveled between the object 802 and the Rx unit 110.

The second computing machine 138 is configured to produce first radar-based spatial information indicative of angle at arrival of the radar waveform at times $t_1$ and $t_2$, represented by $\theta_1$ and $\theta_2$. The Rx antenna array 112 captures the wavefront of the radar waveform at $t_1$ as it moves across the antenna array and again at $t_2$ as it moves across the antenna array. The second processor 139 is configured to process the captured radar waveform information to determine first radar-based spatial information indicative of angle at arrival $\theta_1$ at $t_1$ and angle at arrival $\theta_2$ at $t_2$, which are identical in this example.

The second computing machine 138 is configured to produce second radar-based spatial information indicative of an estimated distance $R_1$ at $t_1$ and of an estimated distance $R_2$ at $t_2$, between the Tx unit and the Rx unit. The Rx unit's antenna array 112 captures a first timing pulse as $t_1$ and captures a second timing pulse at $t_2$. The second processor 139 is configured to process the captured first pulse and the captured second pulse to determine second radar-based spatial information indicative of estimated distances $R_1$ and $R_2$, where, $$R(t_1) = r_0(t_1) + r_1(t_1) + b$$

$$R(t_2) = r_0(t_2) + r_1(t_2) + b$$

There exists an unknown timing pulse bias (that leads to a range (distance) bias denoted herein by "b"), in each of the distance estimates, $R_1$ and $R_2$.

An example second processor 139 is configured to use radar-based spatial information concerning the object 802, specifically, $R(t_1)$, $R(t_2)$, $\theta_1$, and $\theta_2$, to determine whether or not the object 802 is in motion. In this fourth example, the processor 139 determines that the object 802 is stationary if, $$R(t_1) = R(t_2) \text{ and } \theta_1 = \theta_2$$

Otherwise, processor 139 determines that the object 802 is determined to be in motion.

Example 5

Figure 9:
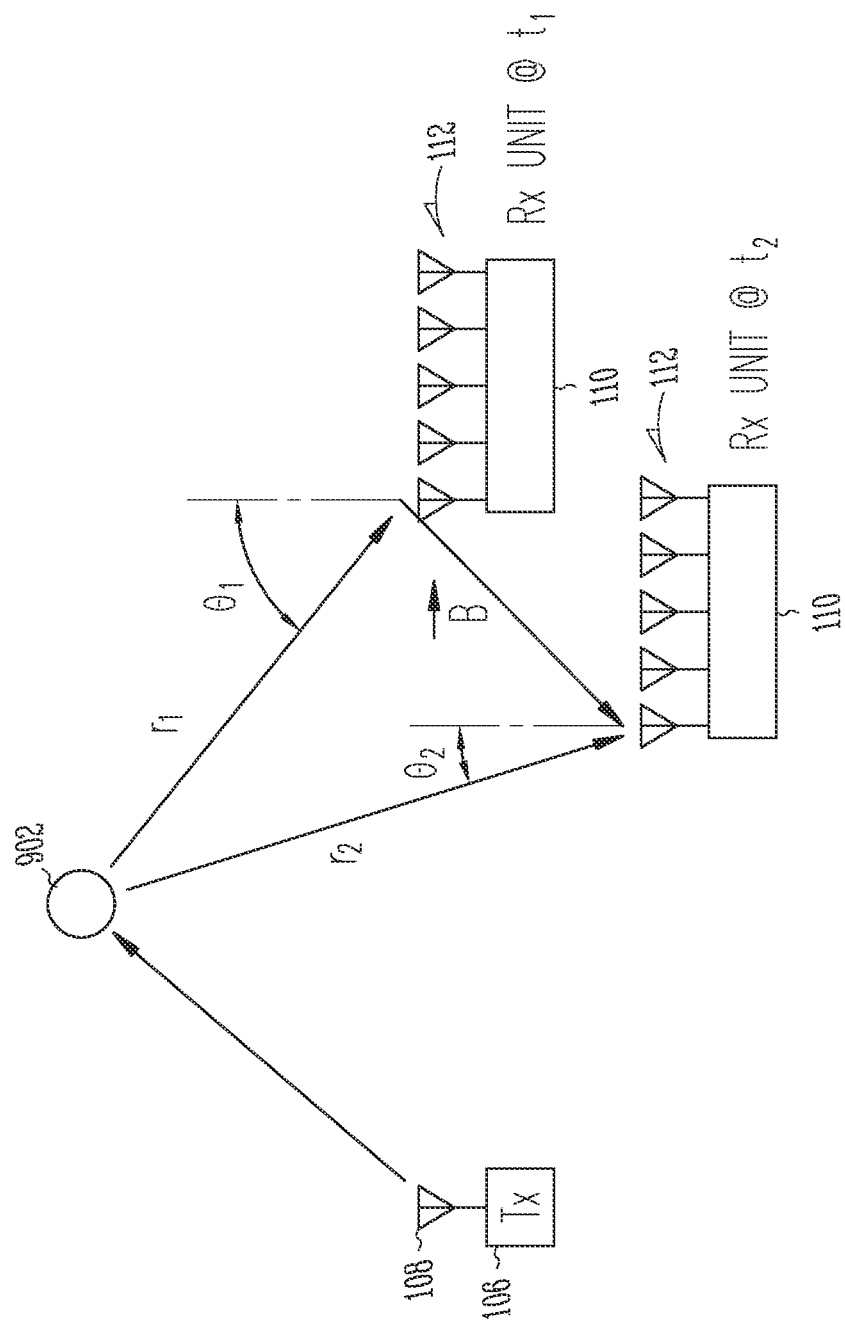
FIG. 9 is an illustrative block diagram representing a fifth example arrangement in which the Tx unit and the Rx are in motion in relation to one another and the Tx unit transmits a radar waveform that is received by the Rx unit after reflecting from a target object.

FIG. 9 is an illustrative block diagram representing a fifth example arrangement in which the Tx unit 106 and the Rx 110 are in motion in relation to one another and the Tx unit 110 transmits a radar waveform that is received by the Rx unit after reflecting from a target object 902. In this fifth example, it is assumed that the Tx unit is stationary, and the Rx unit is in motion.

The first spatial position indicator unit 118 provides first spatial information that indicates a spatial position of the Tx unit 106. The first communication device 120 co-located with the Tx unit 106 communicates the first spatial information over the side channel 124 to the second communication device 142 co-located with the Rx unit 110.

The second spatial indicator 140 provides second spatial information that indicates a spatial position of the Rx unit 110. More particularly, the second spatial indicator 140 provides second information that indicates a spatial motion pattern of the Rx unit. For simplicity, the spatial motion pattern is assumed to be linear motion at constant velocity along vector $\vec{B}$.

The Tx unit transmits a radar waveform to the Rx unit that includes a first radar pulse at time $t_1$ and that includes a second radar pulse at time $t_2$. At $t_1$, the actual distance between the Tx unit and the Rx unit is $r_1$. At $t_2$, the actual distance between the Tx unit and the Rx unit is $r_2$.

The second computing machine 138 is configured to produce first radar-based spatial information indicative of angle at arrival of the radar waveform at the receiver antenna array 12 at times $t_1$ and $t_2$, represented by $\theta_1$ and $\theta_2$, respectively. An example second processor 139 is configured to process the captured waveform information to produce the first radar-based spatial information indicative of angle at arrival $\theta_1$ at $t_1$ and angle at arrival $\theta_2$ at $t_2$.

The second computing machine 138 is configured to produce second radar-based spatial information indicative of estimated distances $R_1$ and $R_2$ between the Tx unit and the Rx unit at $t_1$ and at $t_2$, respectively. The example second processor 139 is configured to process a captured first pulse captured at $t_1$ and a second pulse captured at $t_2$ to produce the estimated distances, $R_1$ and $R_2$.

The example second processor 139 is configured to determine, based upon the produced first and second radar information and the first and second spatial information whether or not the target is in motion. The values $\theta_1$ $\theta_2$ and a magnitude of the velocity along vector $\vec{B}$ can be used to estimate values for $r_0+r_1$ and $r_0+r_2$. From the discussion above, it will be appreciated that, $R_1=r_0+r_1+b$, and $R_2=r_0+r_2+b$, If it is assumed that the target object 902 is stationary between time t1 and t2, then the following condition should hold: $\Delta R=R1-R2\approx\Delta r=r1-r2$. Thus, a determination can be made that the target is moving based upon a Threshold difference between $\Delta R$ and $\Delta r$ using the following rules, for example:

$$\begin{cases} |\Delta R - \Delta r| \geq \text{Threshold} \rightarrow \text{Moving target} \\ |\Delta R - \Delta r| < \text{Threshold} \rightarrow \text{Stationary target} \end{cases}$$

Moreover, if the target object 902 is determined to be stationary, then determined values for r1 and r2 can be determined, through triangulation, directly based upon $\theta_1$, $\theta_2$ and $\vec{B}$.

Example 6

Figure 10:
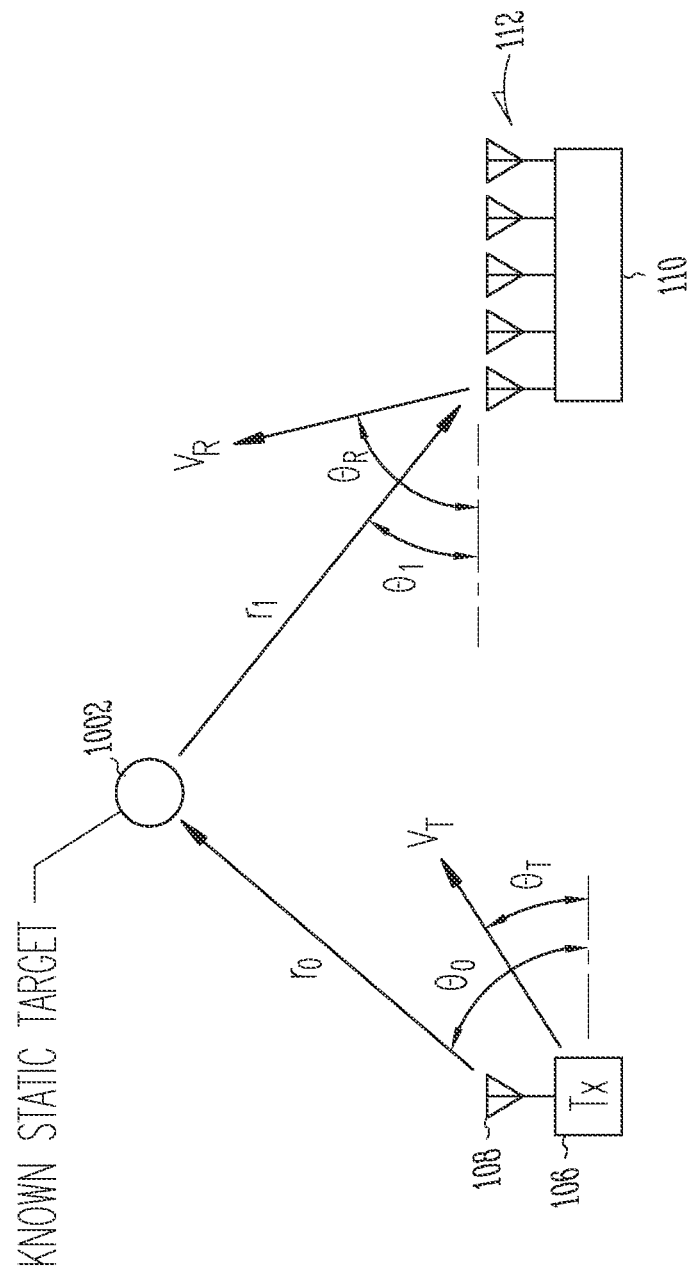
FIG. 10 is an illustrative block diagram representing a sixth example arrangement in which a phase shift is determined between the local oscillator at the Rx unit and the local oscillator at the Tx unit.

FIG. 10 is an illustrative block diagram representing a sixth example arrangement in which a phase shift is determined, between the second local oscillator 154 at the Rx unit 110 and the first local oscillator 136 at the Tx unit 106. In this sixth example, it is assumed that the target object 1002 is static i.e. not in motion. The first spatial position indicator unit 118 provides first spatial information that indicates a spatial position of the Tx unit 106. The first communication device 120 co-located with the Tx unit 106 communicates the first spatial information over the side channel 124 to the second communication device 142 co-located with the Rx unit 110. Target object 1002 spatial location information can be received at the example second processor 139 via the side channel 124 or via apriori map information or via a spatial sensor (e.g., a vision system) co-located with the Rx unit 110, for example. Alternatively, the example second processor 139 at the Rx unit receives second spatial information indicative of a spatial disposition of the Rx unit via the second spatial indicator 140 such as a map system 168 or vision system 166, for example.

From the explanation provided with the examples above, it will be appreciated that the Rx unit 110 can produce radar-based spatial information $R_1$ that represents an estimated range represented as follows, $R1=r_0+r_1+b$ Moreover, from the above examples, it will be appreciated that since spatial locations of the Tx unit and static target are known, values for $r_0$ and $r_1$ are known. Therefore, a value for the timing bias b can be determined since, $b=R_1-r_0-r_1$ The second processor 139 is configured to estimate timing clock bias between the Tx unit and the Rx unit as explained in the above examples. Compensation for the clock timing bias is achieved as explained in the above examples.

The second processor 139 is further configured to determine and compensate a phase difference between local oscillators at the Tx and Rx units, once compensation is provided for frequency difference between local oscillators at the Tx and Rx units.

More particularly, an Expected Doppler frequency shift seen through a path from the Tx unit 106 to the static target object 1002 to the Rx unit 110, is given by $$f_e = \text{Expected Doppler} = \frac{V_T}{C}f_0\text{Cos}(\theta_0 - \theta_T) + \frac{V_R}{c}f_0\text{Cos}(\theta_1 - \theta_R)$$

Where $V_T$ is velocity of the Tx unit, $V_R$ is velocity of the Rx unit, $\theta_0$ is the angle of departure from the Tx unit to the known stationary object, $\theta_1$ is angle at arrival of radar waveform at the Rx unit, $\theta_T$ is direction of motion of the Tx unit, and $\theta_R$ is direction of motion of the Rx unit.

An expected doppler phase shift is given by, $\varphi_e(t)=2\pi f_e t$

With mismatch between the $f_0$ and $f_1$ local oscillator frequencies compensated, a measured phase difference between them that is different from $\varphi_e(t)$ indicates a phase shift error. The error amount is the difference between the measured phase difference and the expected doppler phase shift. The error in the measured phase shift is corrected through compensation, either by shifting a phase of the second LO 154 or adjusting saved digital waveform data, for example, to virtually synchronize phase of a radar waveform at the Tx unit and the Rx unit.

It will be appreciated, that after achieving virtual synchronization of the Tx and Rx units in time, frequency and phase, 'drifts' in clocks and oscillators may occur. The techniques described above can be used to periodically determine estimated mismatch due to such drifts, for example, and to compensate for the errors. Moreover, once the Tx unit 106 and Rx unit 110 are virtually synchronized radar data obtained at the Rx unit is used to estimate the parameters at other stationary or dynamic targets in a scene within a field of view of the Rx unit. During operation while virtually synchronized, one or more of timing, frequency and phase mismatch are corrected due to drift, for example.

Computing Machine

Figure 11:
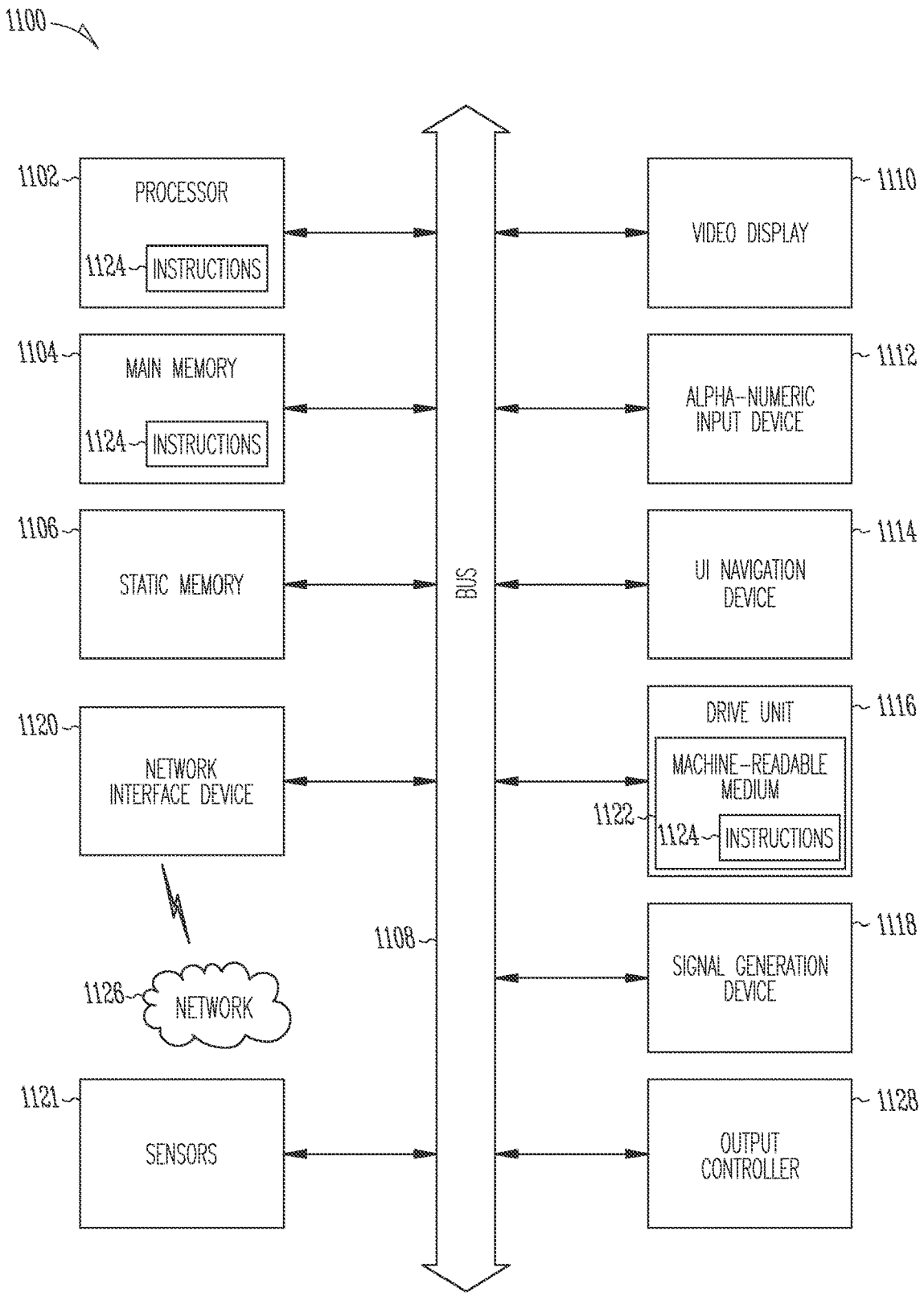
FIG. 11 is an illustrates a block diagram of an example computing machine in accordance with some embodiments.

FIG. 11 is an illustrates a block diagram of an example computing machine 1100 in accordance with some embodiments. In some embodiments, the computing machine 1100 may store the components shown in the circuit block diagram of FIG. 11. Example first and second computing machines 116, 138 are implemented consistent with the computing machine 1100. For example, circuitry that resides in the processor 1102 and may be referred to as "processing circuitry." Processing circuitry may include processing hardware, for example, one or more central processing units (CPUs), one or more graphics processing units (GPUs), and the like. In alternative embodiments, the computing machine 1100 may operate as a standalone device or may be connected (e.g., networked) to other computers. In a networked deployment, the computing machine 1100 may operate in the capacity of a server, a client, or both in server-client network environments. In an example, the computing machine 1100 may act as a peer machine in peer-to-peer (P2P) (or other distributed) network environment. In this document, the phrases P2P, device-to-device (D2D) and sidelink may be used interchangeably. The computing machine 1100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 1100 may include a hardware processor 1102 (e.g., a central processing unit (CPU), a GPU, a hardware processor core, or any combination thereof), a main memory 1104 and a static memory 1106, some or all of which may communicate with each other via an interlink (e.g., bus) 1108. Example processors 117, 139 can be implemented consistent with the hardware processor 1102. Although not shown, the main memory 1104 may contain any or all of removable storage and non-removable storage, volatile memory, or non-volatile memory. The computing machine 1100 may further include a video display unit 110 (or other display unit), an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The computing machine 1100 may additionally include a storage device (e.g., drive unit) 1116, a signal generation device 1118 (e.g., a speaker), a network interface device 1120, and one or more sensors 1121, such as a global positioning system (UPS) sensor, compass, accelerometer, or other sensor. The computing machine 1100 may include an output controller 1128, such as a serial (e.g., universal serial bus (USB), parallel, or other wired or wireless (e.g., infrared (IR), near field communication (NFC), etc. connection to communicate or control one or more peripheral devices (e.g., a printer, card reader, etc.).

The drive unit 1116 (e.g., a storage device) may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the computing machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the computing machine 1100 and that cause the computing machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126.

Some aspects of the technology disclosed herein are described below as examples. These examples do not limit the technology disclosed herein.

Example 1 is a partially coordinated radar system comprising: a radar transmitter including a first timing clock and a first local oscillator (LO), configured to transmit a radar waveform signal; a radar receiver including a second timing clock and a second LO, configured to receive the radar waveform signal; processing circuitry; at least one first spatial indicator co-located with one of the radar transmitter and the radar receiver to provide first spatial information indicative of a spatial disposition of the one of the radar transmitter and the radar receiver; a first communication device co-located with the radar transmitter and operably coupled to receive waveform information used to configure the radar transmitter and to transmit the radar waveform information; a second communication device co-located with the radar receiver and configured to receive the transmitted waveform information and operably coupled to provide the received waveform information to the processing circuitry; a memory operably coupled to the processing circuitry, and storing instructions which, when executed by the processing circuitry, cause the processing circuitry to perform operations comprising: using the waveform information to configure the radar receiver to receive the waveform signal; determining radar-based spatial information based at least in part upon the radar waveform signal received from the radar transmitter; determining at least one of a mismatch between first clock timing and second clock timing and a mismatch between first LO local frequency and second LO frequency based at least in part upon the first spatial information and the radar-based spatial information; generating a compensation signal indicating correction information to compensate for the determined at least one mismatch.

In Example 2, the subject matter of Example 1, wherein the at least one first spatial indicator is co-located with the radar transmitter to provide first spatial information indicative of a spatial disposition of the radar transmitter; wherein the first communication device is configured to transmit the first spatial information; wherein the second communication device is configured to receive the transmitted first spatial information and to provide the first spatial information to the processing circuitry.

In Example 3, the subject matter of Example 1 further including: at least one second spatial indicator co-located with the other of the radar transmitter and the radar receiver to provide second spatial information indicative of a spatial disposition of the other of the radar transmitter and the radar receiver; wherein determining at least one of a mismatch between first clock timing and second clock timing and a mismatch between first LO local frequency and second LO frequency includes determining based at least in part upon the second spatial information.

In Example 4, the subject matter of Example 1 further including: adjusting at least one of timing of the second timing clock and frequency of the second LO based upon the compensation signal.

In Example 5, the subject matter of Example 1 further including: a saved digital representation of a radar waveform, to produce an adjusted saved digital representation of the radar waveform that would have resulted if the second clock had been time shifted to compensate for a timing clock mismatch at the time of arrival of the radar waveform; and a saved digital representation of a radar waveform, to produce an adjusted saved digital representation of the radar waveform that would have resulted if a frequency of the second LO had been adjusted to compensate for a LO mismatch at the time of arrival of the radar waveform.

In Example 6, the subject matter of Example 1, wherein the determined radar-based spatial information is indicative of a spatial disposition of the first radar transmitter.

In Example 7, the subject matter of Example 1, wherein the determined radar-based spatial information is indicative of a spatial disposition of the first radar receiver.

In Example 8, the subject matter of Example 1, wherein the determined radar-based spatial information is indicative of a spatial disposition of an object that reflects the radar waveform signal.

In Example 9, the subject matter of Example 1, wherein the first spatial information is indicative of a pattern of motion of the one of the radar transmitter and the radar receiver.

In Example 10, the subject matter of Example 1, wherein the first spatial information is indicative of a location of the one of the radar transmitter and the radar receiver.

In Example 11, the subject matter of Example 1, wherein the radar-based spatial information includes estimated distance between the radar transmitter and the radar receiver.

In Example 12, the subject flatter of Example 1, wherein the radar-based spatial information includes an angle at arrival of the radar waveform signal at the radar receiver.

In Example 13, the subject matter of Example 1 wherein the radar-based spatial information includes a doppler frequency indicative of relative motion between the radar transmitter and the radar receiver.

In Example 14, the subject matter of Example 1, wherein the first spatial information is indicative of a spatial disposition of the one of the radar transmitter and the radar receiver.

In Example 15, the subject matter of Example 1, wherein the first spatial indicator includes at least one of a vision system and a radar system and the first spatial information is indicative of a spatial disposition of an object within a field of view of the at least one of the vision system and radar system.

Example 16 is a method to operate a partially coordinated radar system comprising: transmitting a radar waveform signal by a radar transmitter that includes a first timing clock and a first local oscillator (LO); receiving the radar waveform signal by a radar waveform receiver including a second timing clock and a second LO; obtaining first spatial information from a first spatial indicator, that is indicative of a spatial disposition of one of the radar transmitter and the radar receiver; using the radar receiver to determine radar-based spatial information based at least in part upon the radar waveform signal transmitted by the radar transmitter; determining at least one of a mismatch between first clock timing and second clock timing and a mismatch between first LO local frequency and second LO frequency based at least in part upon the first spatial information and the radar-based spatial information; generating a compensation signal indicating correction information to compensate for the determined at least one mismatch.

In Example 17, the subject matter of Example 16, wherein obtaining the first spatial information from a first spatial indicator includes obtaining the first spatial information from a first spatial indicator that is co-located with the one of the radar transmitter and the radar receiver.

In Example 18, the subject matter of Example 16, further including: obtaining second spatial information from a second spatial indicator, that is indicative of a spatial disposition of the other of the radar transmitter and the radar receiver; wherein determining at least one of a mismatch between first clock timing and second clock timing and a mismatch between first LO local frequency and second LO frequency includes determining based at least in part upon the second spatial information.

In Example 19, the subject matter of Example 16, further including: transmitting by a communication device co-located with the radar transmitter, waveform information used to configure the radar transmitter to transmit the radar waveform signal; receiving by a communication device co-located with the radar receiver, the transmitted waveform information; and using the waveform information to configure the radar receiver to receive the waveform signal.

In Example 20, the subject matter of Example 16, further including: adjusting at least one of timing of the second timing clock and frequency of the second LO based upon the compensation signal.

In Example 21, the subject matter of Example 16, further including: adjusting at least one of, a saved digital representation of a radar waveform, to produce an adjusted saved digital representation of the radar waveform that would have resulted if the second clock had been time shifted to compensate for a timing clock mismatch at the time of arrival of the radar waveform; and a saved digital representation of a radar waveform, to produce an adjusted saved digital representation of the radar waveform that would have resulted if a frequency of the second LO had been adjusted to compensate for a LO mismatch at the time of arrival of the radar waveform.

In Example 22, the subject matter of Example 16, wherein the determined radar-based spatial information is indicative of a spatial disposition of the first radar transmitter.

In Example 23, the subject matter of Example 16, wherein the determined radar-based spatial information is indicative of a spatial disposition of the first radar receiver.

In Example 24, the subject matter of Example 16, wherein the determined radar-based spatial information is indicative of a spatial disposition of an object that reflects the radar waveform signal.

In Example 25, the subject matter of Example 16, wherein the first spatial information is indicative of a pattern of motion of the one of the radar transmitter and the radar receiver.

In Example 26, the subject flatter of Example 16, wherein the first spatial information is indicative of a location of the one of the radar transmitter and the radar receiver.

In Example 27, the subject matter of Example 16, wherein the radar-based spatial information includes estimated distance between the radar transmitter and the radar receiver.

In Example 28, the subject matter of Example 16, wherein the radar-based spatial information includes an angle at arrival of the radar waveform signal at the radar receiver.

In Example 29, the subject matter of Example 16, wherein the radar-based spatial information includes a doppler frequency indicative of relative motion between the radar transmitter and the radar receiver.

Example 30 is a partially coordinated radar system comprising: a first radar transmitter including a first timing clock and a first local oscillator (LO), configured to transmit a radar waveform signal; a first radar receiver including a second timing clock and a second LO, configured to receive the radar waveform signal; at least one first spatial indicator co-located with the first radar transmitter to provide first spatial information indicative of a spatial disposition of the first radar transmitter; a first communication device co-located with the radar transmitter and operably coupled to receive the first spatial information from the at least one first spatial indicator and configured to transmit the first spatial information; a second communication device co-located with the first radar receiver and configured to receive the transmitted first spatial information; at least one second spatial indicator co-located with the radar receiver to provide second spatial information indicative of a spatial disposition of the radar receiver; processing circuitry; and a memory operably coupled to the processing circuitry and storing instructions which, when executed by the processing circuitry, cause the processing circuitry to perform operations comprising: determining radar-based spatial information based at least in part upon the received radar waveform received from the radar transmitter; determining at least one of a mismatch between first clock timing and second clock timing and a mismatch between first LO local frequency and second LO frequency based at least in part upon the first spatial information, the second spatial information and the radar-based spatial information; generating a compensation signal indicating correction information to compensate for the determined at least one mismatch.

In Example 31, the subject flatter of Example 30, wherein the first spatial indicator includes at least one of a first global position indicator, a first accelerometer, a first inertial measurement system (IMU).

In Example 32, the subject matter of Example 30, wherein the second spatial indicator includes at least one of a second global position indicator, a second accelerometer, a second inertial measurement system (IMU).

In Example 33, the subject matter of Example 30, wherein the first spatial indicator includes a first vision system to measure location of objects within a field of view of the Tx unit.

In Example 34, the subject matter of Example 30, wherein the second spatial indicator includes a second vision system to measure location of objects within a field of view of the Rx unit.

In Example 35, the subject matter of Example 30, wherein the first spatial indicator includes a radar system including a second Tx unit synchronized with a second Rx unit that interoperate to measure location of objects relative to the second Rx unit.

In Example 36, the subject matter of Example 30, wherein the second spatial indica includes a radar system including a third Tx unit synchronized with a third Rx unit that interoperate to measure location of objects relative to the third Rx unit.

In Example 37, the subject matter of Example 30, wherein the first spatial indicator includes at least one of a first map system and a first pre-stored fixed information.

In Example 38, the subject matter of Example 30, wherein the second spatial indicator includes at least one of a second map system and second pre-stored fixed information.

In Example 39, the subject matter of Example 30, wherein the correction information includes at least one of correction information indicating an adjustment in the timing of the second timing clock and correction information indicating an adjustment of frequency of the second LO.

In Example 40, the subject matter of Example 30, wherein the correction information includes at least one of, correction information indicating an adjustment of a saved digital representation of a radar waveform to produce an adjusted saved digital data that would have resulted if the second clock had been time shifted at the time of arrival of the radar waveform; and correction information indicating an adjustment of a saved digital representation of a radar waveform to produce an adjusted saved digital data that would have resulted if a frequency of the second LO had been adjusted at the time of arrival of the radar waveform.

In Example 41, the subject matter of Example 30, wherein the determined radar-based spatial information is indicative of a spatial disposition of the first radar transmitter.

In Example 42, the subject matter of Example 30, wherein the determined radar-based spatial information is indicative of a spatial disposition of the first radar receiver.

In Example 43, the subject matter of Example 30, wherein the determined radar-based spatial information is indicative of a spatial disposition of an object that reflects the radar waveform signal.

In Example 44, the subject n of Example 30, wherein the processing circuitry is co-located with the radar receiver.

In Example 45, the subject matter of claim 30, wherein determining at least one of a mismatch includes determining at least one of a mismatch includes between a first clock timing and second clock timing and a mismatch between first LO local frequency and second LO frequency and a mismatch between a first LO phase and a second LO phase based at least in part upon the first spatial information and the radar-based spatial information.

The above description is presented to enable any person skilled in the art to create and use a partially coordinated radar system. Various modifications to the examples will be readily apparent to those skilled in the art, and the generic principles defined herein may be applied to other examples and applications without departing from the spirit and scope of the invention. In the preceding description, numerous details are set forth for the purpose of explanation. However, one of ordinary skill in the art will realize that the examples in the disclosure might be practiced without the use of these specific details. In other instances, well-known processes are shown in block diagram form in order not to obscure the description of the invention with unnecessary detail. Identical reference numerals are used in some places to represent different views of the same or similar items in different drawings. Thus, the foregoing description and drawings of embodiments and examples are merely illustrative of the principles of the invention. Therefore, it will be understood that various modifications can be made to the embodiments by those skilled in the art without departing from the spirit and scope of the invention, which is defined in the appended claims.

The invention claimed is:

1. A partially coordinated radar system comprising:
   a radar transmitter including a first timing clock and a first local oscillator (LO), configured to transmit a radar waveform signal;
   a radar receiver including a second timing clock and a second LO, configured to receive the radar waveform signal;
   processing circuitry;
   at least one first spatial indicator co-located with one of the radar transmitter and the radar receiver to provide first spatial information indicative of a spatial disposition of the one of the radar transmitter and the radar receiver;
   at least one second spatial indicator co-located with the other of the radar transmitter and the radar receiver to provide second spatial information indicative of a spatial disposition of the other of the radar transmitter and the radar receiver;
   a first communication device co-located with the radar transmitter and operably coupled to receive waveform information used to configure the radar transmitter and to transmit the radar waveform information;
   a second communication device co-located with the radar receiver and configured to receive the transmitted waveform information and operably coupled to provide the received waveform information to the processing circuitry;
   a memory operably coupled to the processing circuitry, and storing instructions which, when executed by the processing circuitry, cause the processing circuitry to perform operations comprising:
   using the waveform information to configure the radar receiver to receive the waveform signal;
   determining radar-based spatial information based at least in part upon the radar waveform signal received from the radar transmitter;
   determining at least one of a mismatch between first clock timing and second clock timing and a mismatch between first LO local frequency and second LO frequency based at least in part upon the first spatial information the second spatial information, and the radar-based spatial information;
   generating a compensation signal indicating correction information to compensate for the determined at least one mismatch.

2. The partially coordinated radar system of claim 1,
   wherein the first spatial information is indicative of a spatial disposition of the one of the radar transmitter and the radar receiver;
   wherein the at least one first spatial indicator is co-located with the radar transmitter to provide first spatial information indicative of a spatial disposition of the radar transmitter;
   wherein the first communication device is configured to transmit the first spatial information;
   wherein the second communication device is configured to receive the transmitted first spatial information and to provide the first spatial information to the processing circuitry.

3. The partially coordinated radar system of claim 1 further including:
   adjusting at least one of timing of the second timing clock and frequency of the second LO based upon the compensation signal.

4. The partially coordinated radar system of claim 1,
   wherein the determined radar-based spatial information is indicative of a spatial disposition of the first radar transmitter.

5. The partially coordinated radar system of claim 1,
   wherein the determined radar-based spatial information is indicative of a spatial disposition of the first radar receiver.

6. The partially coordinated radar system of claim 1,
   wherein the determined radar-based spatial information is indicative of a spatial disposition of an object that reflects the radar waveform signal.

7. The partially coordinated radar system of claim 1,
   wherein determining the radar-based spatial information based at least in part upon the radar waveform signal received from the radar transmitter includes,
   determining an angle of arrival at the radar receiver of a radar waveform signal pulse transmitted at a first time and determining an angle of arrival at the radar receiver of a radar waveform signal pulse transmitted at a second time.

8. The partially coordinated radar system of claim 1,
   wherein determining the radar-based spatial information based at least in part upon the radar waveform signal received from the radar transmitter includes:
   determining an angle of arrival at the radar receiver of a radar waveform signal pulse transmitted at a first time and determining an angle of arrival at the radar receiver of a radar waveform signal pulse transmitted at a second time; and determining an estimated distance traveled between the radar transmitter and the radar receiver by the radar waveform signal pulse transmitted at the first time and determining an estimated distance traveled between the radar transmitter and the radar receiver by the radar waveform signal pulse transmitted at the second time.

9. A partially coordinated radar system comprising:
a radar transmitter including a first timing clock and a first local oscillator (LO), configured to transmit a radar waveform signal;
a radar receiver including a second timing clock and a second LO, configured to receive the radar waveform signal;
processing circuitry;
at least one first spatial indicator co-located with one of the radar transmitter and the radar receiver to provide first spatial information;
a first communication device co-located with the radar transmitter and operably coupled to receive waveform information used to configure the radar transmitter and to transmit the radar waveform information;
a second communication device co-located with the radar receiver and configured to receive the transmitted waveform information and operably coupled to provide the received waveform information to the processing circuitry;
a memory operably coupled to the processing circuitry, and storing instructions which, when executed by the processing circuitry, cause the processing circuitry to perform operations comprising:
using the waveform information to configure the radar receiver to receive the waveform signal;
determining radar-based spatial information based at least in part upon the radar waveform signal received from the radar transmitter;
determining at least one of a mismatch between first clock timing and second clock timing and a mismatch between first LO local frequency and second LO frequency based at least in part upon the first spatial information and the radar-based spatial information;
generating a compensation signal indicating correction information to compensate for the determined at least one mismatch; and
adjusting at least one of,
a saved digital representation of a radar waveform, to produce an adjusted saved digital representation of the radar waveform that would have resulted if the second clock had been time shifted to compensate for a timing clock mismatch at the time of arrival of the radar waveform; and
a saved digital representation of a radar waveform, to produce an adjusted saved digital representation of the radar waveform that would have resulted if a frequency of the second LO had been adjusted to compensate for a LO mismatch at the time of arrival of the radar waveform.

10. A method to operate a partially coordinated radar system comprising:
transmitting a radar waveform signal by a radar transmitter that includes a first timing clock and a first local oscillator (LO);
receiving the radar waveform signal by a radar waveform receiver including a second timing clock and a second LO;
obtaining first spatial information from a first spatial indicator;
using the radar receiver to determine radar-based spatial information based at least in part upon the radar waveform signal transmitted by the radar transmitter;
determining at least one of a mismatch between first clock timing and second clock timing and a mismatch between first LO local frequency and second LO frequency based at least in part upon the first spatial information and the radar-based spatial information;
generating a compensation signal indicating correction information to compensate for the determined at least one mismatch; and
adjusting at least one of,
a saved digital representation of a radar waveform, to produce an adjusted saved digital representation of the radar waveform that would have resulted if the second clock had been time shifted to compensate for a timing clock mismatch at the time of arrival of the radar waveform; and
a saved digital representation of a radar waveform, to produce an adjusted saved digital representation of the radar waveform that would have resulted if a frequency of the second LO had been adjusted to compensate for a LO mismatch at the time of arrival of the radar waveform.

11. The method of claim 10,
wherein obtaining the first spatial information from a first spatial indicator includes obtaining the first spatial information from a first spatial indicator that is co-located with the one of the radar transmitter and the radar receiver.

12. The method of claim 10 further including:
obtaining second spatial information from a second spatial indicator, that is indicative of a spatial disposition of the other of the radar transmitter and the radar receiver;
wherein determining at least one of a mismatch between first clock timing and second clock timing and a mismatch between first LO local frequency and second LO frequency includes determining based at least in part upon the second spatial information.

13. The method of claim 10 further including:
transmitting by a communication device co-located with the radar transmitter, waveform information used to configure the radar transmitter to transmit the radar waveform signal;
receiving by a communication device co-located with the radar receiver, the transmitted waveform information; and
using the waveform information to configure the radar receiver to receive the waveform signal.

14. The method of claim 10 further including:
adjusting at least one of timing of the second timing clock and frequency of the second LO based upon the compensation signal.

15. The method of claim 10,
wherein the determined radar-based spatial information is indicative of a spatial disposition of the first radar transmitter.

16. The method of claim 10,
wherein using the radar receiver to determine radar-based spatial information based at least in part upon the radar waveform signal transmitted by the radar transmitter includes,
determining an angle of arrival at the radar receiver of a radar waveform signal pulse transmitted at a first time and determining an angle of arrival at the radar receiver of a radar waveform signal pulse transmitted at a second time.

17. The method of claim 10,
wherein using the radar receiver to determine radar-based spatial information based at least in part upon the radar waveform signal transmitted by the radar transmitter includes,
determining an angle of arrival at the radar receiver of a radar waveform signal pulse transmitted at a first time and determining an angle of arrival at the radar receiver of a radar waveform signal pulse transmitted at a second time; and
determining an estimated distance traveled between the radar transmitter and the radar receiver by the radar waveform signal pulse transmitted at the first time and determining an estimated distance traveled between the radar transmitter and the radar receiver by the radar waveform signal pulse transmitted at the second time.

18. A partially coordinated radar system comprising:
a first radar transmitter including a first timing clock and a first local oscillator (LO), configured to transmit a radar waveform signal;
a first radar receiver including a second timing clock and a second LO, configured to receive the radar waveform signal;
at least one first spatial indicator co-located with the first radar transmitter to provide first spatial information indicative of a spatial disposition of the first radar transmitter;
a first communication device co-located with the radar transmitter and operably coupled to receive the first spatial information from the at least one first spatial indicator and configured to transmit the first spatial information;
a second communication device co-located with the first radar receiver and configured to receive the transmitted first spatial information;
at least one second spatial indicator co-located with the radar receiver to provide second spatial information indicative of a spatial disposition of the radar receiver;
processing circuitry; and
a memory operably coupled to the processing circuitry and storing instructions which, when executed by the processing circuitry, cause the processing circuitry to perform operations comprising:
determining radar-based spatial information based at least in part upon the received radar waveform received from the radar transmitter;
determining at least one of a mismatch between first clock timing and second clock timing and a mismatch between first LO local frequency and second LO frequency based at least in part upon the first spatial information, the second spatial information and the radar-based spatial information;
generating a compensation signal indicating correction information to compensate for the determined at least one mismatch;
wherein the correction information includes at least one of,
correction information indicating an adjustment of a saved digital representation of a radar waveform to produce an adjusted saved digital data that would have resulted if the second clock had been time shifted at the time of arrival of the radar waveform; and
correction information indicating an adjustment of a saved digital representation of a radar waveform to produce an adjusted saved digital data that would have resulted if a frequency of the second LO had been adjusted at the time of arrival of the radar waveform.

19. The partially coordinated radar system of claim 18,
wherein the correction information includes at least one of correction information indicating an adjustment in the timing of the second timing clock and correction information indicating an adjustment of frequency of the second LO.

20. The partially coordinated radar system of claim 18,
wherein the determined radar-based spatial information is indicative of a spatial disposition of the first radar transmitter.

21. The partially coordinated radar system of claim 18,
wherein the determined radar-based spatial information is indicative of a spatial disposition of the first radar receiver.

22. The partially coordinated radar system of claim 18,
wherein the determined radar-based spatial information is indicative of a spatial disposition of an object that reflects the radar waveform signal.

23. A partially coordinated radar system comprising:
a first radar transmitter including a first timing clock and a first local oscillator (LO), configured to transmit a radar waveform signal;
a first radar receiver including a second timing clock and a second LO, configured to receive the radar waveform signal;
at least one first spatial indicator co-located with the first radar transmitter to provide first spatial information indicative of a spatial disposition of the first radar transmitter;
a first communication device co-located with the radar transmitter and operably coupled to receive the first spatial information from the at least one first spatial indicator and configured to transmit the first spatial information;
a second communication device co-located with the first radar receiver and configured to receive the transmitted first spatial information;
at least one second spatial indicator co-located with the radar receiver to provide second spatial information indicative of a spatial disposition of the radar receiver;
processing circuitry; and
a memory operably coupled to the processing circuitry and storing instructions which, when executed by the processing circuitry, cause the processing circuitry to perform operations comprising:
determining radar-based spatial information based at least in part upon the received radar waveform received from the radar transmitter;
determining at least one of a mismatch between first clock timing and second clock timing and a mismatch between first LO local frequency and second LO frequency and a mismatch between a phase of the first LO and a phase of the second LO, based at least in part upon the first spatial information, the second spatial information and the radar-based spatial information; and
generating a compensation signal indicating correction information to compensate for the determined at least one mismatch.

24. A partially coordinated radar system comprising:
a radar transmitter, including a first timing clock and a first local oscillator (LO), configured to transmit a first continuous wave first pilot signal that provides first spatial information;

a radar receiver configured to receive the first pilot signal, the radar receiver including a second timing clock and a second LO configured to generate a continuous wave second pilot signal, the radar receiver including a mixer configured to mix the first pilot and the second pilot to produce a mixed signal having a mixed frequency that is a function of relative velocity between the radar transmitter and the radar receiver and a difference between the frequencies of the first pilot signal and the second pilot signal;

processing circuitry;

at least one spatial indicator co-located with the radar receiver to provide second spatial information indicative of a spatial disposition of the radar receiver;

a first communication device co-located with the radar transmitter and operably coupled to receive waveform information used to configure the radar transmitter and to transmit the radar waveform information;

a second communication device co-located with the radar receiver and configured to receive the transmitted waveform information and operably coupled to provide the received waveform information to the processing circuitry;

a memory operably coupled to the processing circuitry, and storing instructions which, when executed by the processing circuitry, cause the processing circuitry to perform operations comprising:

determining an angle of arrival at the radar receiver of the first pilot signal at a first time and determining an angle of arrival at the radar receiver of first pilot signal at a second time;

determining at least one of a mismatch between first clock timing and second clock timing and a mismatch between first LO local frequency and second LO frequency based at least in part upon:

a mixed frequency signal produced based upon mixing of the first pilot signal, at a first time, with the second pilot signal, a mixed frequency signal produced based upon mixing of the first pilot signal, at a second time, with the second pilot signal, spatial information indicative of a spatial disposition of the radar receiver;

the determined angle of arrival at the radar receiver of the first pilot signal, at the first time, and the determined angle of arrival at the radar receiver of first pilot signal, at the second time;

generating a compensation signal indicating correction information to compensate for the determined at least one mismatch.

* * * * *